US012621568B2

(12) United States Patent
Kokubun et al.

(10) Patent No.: US 12,621,568 B2
(45) Date of Patent: May 5, 2026

(54) FOCUSING CONTROL DEVICE, IMAGING APPARATUS, FOCUSING CONTROL METHOD, AND FOCUSING CONTROL PROGRAM

(71) Applicant: FUJIFILM Corporation, Tokyo (JP)

(72) Inventors: Hideaki Kokubun, Saitama (JP);
Hitoshi Sakurabu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 3 days.

(21) Appl. No.: 18/822,454

(22) Filed: Sep. 2, 2024

(65) Prior Publication Data

US 2025/0088741 A1     Mar. 13, 2025

(30) Foreign Application Priority Data

Sep. 8, 2023     (JP) ................................ 2023-146379

(51) Int. Cl.
H04N 23/67 (2023.01)
G03B 13/36 (2021.01)
H04N 23/611 (2023.01)

(52) U.S. Cl.
CPC ........... H04N 23/672 (2023.01); G03B 13/36 (2013.01); H04N 23/611 (2023.01)

(58) Field of Classification Search
CPC .. H04N 23/611; H04N 23/672; H04N 23/673; H04N 23/667; H04N 23/675; G03B 13/36
USPC ....................................................... 348/345
See application file for complete search history.

(56) References Cited

U.S. PATENT DOCUMENTS

| | | | | |
|---|---|---|---|---|
| 9,854,151 B2 * | 12/2017 | Endo | ......................... | G02B 7/28 |
| 10,200,595 B2 * | 2/2019 | Kimoto | ................. | H04N 1/2145 |
| 11,310,410 B2 * | 4/2022 | Sakato | ................. | H04N 23/672 |
| 12,061,377 B2 * | 8/2024 | Kokubun | ............. | H04N 23/672 |
| 12,063,438 B2 * | 8/2024 | Kokubun | ............. | H04N 23/633 |
| 12,262,113 B2 * | 3/2025 | Inoue | ................... | H04N 23/672 |
| 2013/0321692 A1 * | 12/2013 | Kawanishi | ........... | H04N 23/663 |
| | | | | 359/823 |
| 2014/0176784 A1 * | 6/2014 | Hongu | ................... | H04N 23/61 |
| | | | | 348/349 |
| 2015/0085177 A1 * | 3/2015 | Okada | .................... | G03B 17/14 |
| | | | | 348/345 |
| 2016/0212324 A1 * | 7/2016 | Endo | ......................... | G02B 7/09 |
| 2018/0063416 A1 * | 3/2018 | Kimoto | .................. | H04N 1/215 |
| 2020/0195855 A1 * | 6/2020 | Sakato | .................. | G03B 13/32 |
| 2022/0326479 A1 | 10/2022 | Kokubun | | |
| 2022/0337757 A1 * | 10/2022 | Kokubun | ............. | H04N 23/672 |

(Continued)

FOREIGN PATENT DOCUMENTS

| | | |
|---|---|---|
| JP | 2018037959 | 3/2018 |
| JP | 7171966 | 11/2022 |

*Primary Examiner* — Pritham D Prabhakher
(74) *Attorney, Agent, or Firm* — JCIPRNET

(57) ABSTRACT

There is provided a focusing control device that performs focusing control in each frame period of imaging, the focusing control device comprising: a processor, in which the processor is configured to: predict, in an N-th frame period, a lens driving time for moving a focus lens to a first target focusing position in an (N+1)-th frame period based on first time-series AF information in which AF information obtained in an (N–1)-th frame period is included; and select a driving method of the focus lens that is to be executed in the N-th frame period based on the predicted lens driving time.

15 Claims, 25 Drawing Sheets

(56) References Cited

U.S. PATENT DOCUMENTS

2023/0247288 A1 *  8/2023  Sakurabu ............... G03B 13/36
2023/0319403 A1 *  10/2023  Inoue .................... G03B 13/36
                                          348/349
2024/0244321 A1 *  7/2024  Sugitani .............. H04N 23/675

* cited by examiner

| CONTINUOUS IMAGING MODE | F NUMBER > SETTING VALUE | SETTING VALUE ≥ F NUMBER |
|---|---|---|
| CONTINUOUS-IMAGING-INTERVAL PRIORITY | SECOND STOP CONTROL METHOD | SECOND STOP CONTROL METHOD |
| FOCUS PRIORITY | SECOND STOP CONTROL METHOD | FIRST STOP CONTROL METHOD |

FOCUSING CONTROL DEVICE, IMAGING APPARATUS, FOCUSING CONTROL METHOD, AND FOCUSING CONTROL PROGRAM

CROSS-REFERENCE TO RELATED APPLICATIONS

The present application claims priority under 35 U.S.C. § 119 to Japanese Patent Application No. 2023-146379 filed on Sep. 8, 2023. The above application is hereby expressly incorporated by reference, in its entirety, into the present application.

BACKGROUND

1. Technical Field

The technology of the present disclosure relates to a focusing control device, an imaging apparatus, a focusing control method, and a focusing control program.

2. Description of the Related Art

JP7171966B discloses an imaging apparatus that performs continuous imaging by moving a focus lens while avoiding a period of main exposure by an imaging sensor according to an instruction of a processor and continuously performing the main exposure at a predetermined time interval by the imaging sensor, in which the processor is configured to calculate a first focusing position of the focus lens with respect to a specific subject based on image data obtained by imaging the specific subject with the main exposure by the imaging sensor in a specific frame in which the main exposure is performed in a continuous imaging period, predict a second focusing position of the focus lens with respect to the specific subject in a frame which is a plurality of frames later than the specific frame with reference to the first focusing position in the continuous imaging period, and move the focus lens toward the second focusing position.

JP2018-037959A discloses an imaging apparatus comprising an imaging element including a focus detection pixel, a focus detection unit that performs focus detection of an imaging optical system based on a focus detection signal accumulated by the focus detection pixel, a continuous imaging unit that causes the imaging element to execute accumulation of a recording image signal a plurality of times, a storage unit that stores the recording image signal, a prediction unit that predicts a focusing position of a subject when acquiring the recording image signal based on a result of the focus detection by the focus detection unit and information related to an accumulation timing of the focus detection signal used for the focus detection, and a focus adjustment unit that adjusts a focus of the imaging optical system based on a prediction result by the prediction unit, in which the imaging element accumulates the focus detection signal in a period in which the storage unit cannot store the recording image signal, and the focus detection unit performs the focus detection using the focus detection signal acquired in the period.

SUMMARY

One embodiment according to the technology of the present disclosure provides a focusing control device, an imaging apparatus, a focusing control method, and a focusing control program capable of performing appropriate focusing according to a change in a movement of a subject or a movement of an imaging apparatus.

In order to achieve the above object, according to the present disclosure, there is provided a focusing control device that performs focusing control in each frame period of imaging, the focusing control device comprising: a processor, in which the processor is configured to: predict, in an N-th frame period, a lens driving time for moving a focus lens to a first target focusing position in an (N+1)-th frame period based on first time-series AF information in which AF information obtained in an (N−1)-th frame period is included; and select a driving method of the focus lens that is to be executed in the N-th frame period based on the predicted lens driving time.

Preferably, the processor is configured to, in a case where the lens driving time is longer than a threshold value, select, as the driving method, a first driving method of starting driving of the focus lens toward the first target focusing position at a timing at which the focusing control in the (N+1)-th frame period is in time.

Preferably, the processor is configured to, in a case where the lens driving time is longer than a threshold value, select, as the driving method, a first driving method of starting driving of the focus lens toward the first target focusing position before acquiring the AF information in the N-th frame period.

Preferably, the processor is configured to, in a case where the lens driving time to the first target focusing position is equal to or shorter than a threshold value, select, as the driving method, a second driving method of predicting a second target focusing position in the (N+1)-th frame period based on second time-series AF information in which the AF information in the N-th frame period is included, and starting driving of the focus lens toward the predicted second target focusing position.

Preferably, the processor is configured to, in a case where the lens driving time to the first target focusing position is equal to or shorter than a threshold value, select, as the driving method, a second driving method of predicting a second target focusing position in the (N+1)-th frame period based on second time-series AF information in which the AF information in the N-th frame period is included, and starting driving of the focus lens toward the predicted second target focusing position.

Preferably, the AF information is information acquired by using phase difference detection pixels disposed in an imaging region of an imaging element.

Preferably, the processor is configured to, in a case where an AF area for acquiring the AF information is set in the imaging region: acquire information related to reading of an image that includes the imaging region and is obtained by the imaging element; determine a state of the reading of the image corresponding to the AF area based on the information; and start prediction of the second target focusing position in a case where it is determined that the reading of the image corresponding to the AF area is completed.

Preferably, the AF information used in the first time-series AF information is acquired based on a main image captured once in each of the frame periods.

Preferably, the AF information used in the first time-series AF information is acquired based on a live view image captured in each of the frame periods.

Preferably, the live view image is a latest live view image among a plurality of live view images captured in each of the frame periods.

Preferably, the focusing control is performed during continuous imaging in which a main image is continuously captured over a plurality of frame periods while a release button is being pushed.

Preferably, as a stop control method of stopping the focus lens during movement, two stop control methods of a first stop control method and a second stop control method are provided for the focusing control device, the first stop control method being a method of decelerating the focus lens to a preset speed and then stopping the focus lens by using a constant speed section in which the focus lens is moved at a constant speed, the second stop control method being a method of continuously decelerating the focus lens and stopping the focus lens without using the constant speed section.

Preferably, as continuous imaging modes, two continuous imaging modes of a continuous-imaging-interval priority mode in which a continuous imaging interval is kept constant and a focus priority mode in which accuracy of focusing is prioritized over the continuous imaging interval are provided, and the processor is configured to select the first stop control method in a case where the focus priority mode is selected as the continuous imaging mode and an F number of an optical system including the focus lens is equal to or smaller than a setting value which is preset.

According to the technology of the present disclosure, there is provided an imaging apparatus comprising: the focusing control device according to any one of the above; and an imaging element.

According to the technology of the present disclosure, there is provided a focusing control method of performing focusing control in each frame period of imaging, the focusing control method comprising: predicting, in an N-th frame period, a lens driving time for moving a focus lens to a first target focusing position in an (N+1)-th frame period based on first time-series AF information in which AF information obtained in an (N−1)-th frame period is included; and selecting a driving method of the focus lens that is to be executed in the N-th frame period based on the predicted lens driving time.

According to the technology of the present disclosure, there is provided a focusing control program causing a processor to execute focusing control in each frame period of imaging, the focusing control program causing the processor to execute a process comprising: predicting, in an N-th frame period, a lens driving time for moving a focus lens to a first target focusing position in an (N+1)-th frame period based on first time-series AF information in which AF information obtained in an (N−1)-th frame period is included; and selecting a driving method of the focus lens that is to be executed in the N-th frame period based on the predicted lens driving time.

According to the technology of the present disclosure, it is possible to perform appropriate focusing according to a change in movement of a subject or an imaging apparatus.

BRIEF DESCRIPTION OF THE DRAWINGS

FIG. 5 is a block diagram illustrating an example of a functional configuration of a processor.

FIG. 11 is a diagram illustrating an example of time-series AF information of a subject of which a movement is relatively slow.

FIG. 15 is a diagram illustrating an example of time-series AF information of a subject of which a movement is relatively fast.

FIG. 17 is a timing chart illustrating a first driving method.

FIG. 18 is a timing chart of an example in which a first driving method and a second driving method are switched.

FIG. 24 is a timing chart of processing of the first modification example.

FIG. 25 is a timing chart of processing of a second modification example.

FIG. 29 is a diagram illustrating conditions under which the first stop control method is selected.

DETAILED DESCRIPTION

An example of an embodiment according to the technology of the present disclosure will be described with reference to the accompanying drawings.

First, the terms used in the following description will be described.

In the following description, "IC" is an abbreviation for "integrated circuit". "CPU" is an abbreviation for "central processing unit". "ROM" is an abbreviation for "read only memory". "RAM" is an abbreviation for "random access memory". "CMOS" is an abbreviation for "complementary metal oxide semiconductor".

"FPGA" is an abbreviation for "field programmable gate array". "PLD" is an abbreviation for "programmable logic device". "ASIC" is an abbreviation for "application specific integrated circuit". "OVF" is an abbreviation for "optical view finder". "EVF" is an abbreviation for "electronic view finder". "CNN" is an abbreviation for "convolutional neural network". "AF" is an abbreviation of "auto focus".

As one embodiment of an imaging apparatus, the technology of the present disclosure will be described by using a lens-interchangeable digital camera as an example. Note that the technology of the present disclosure is not limited to the lens-interchangeable type and can also be applied to a lens-integrated digital camera.

Figure 1:
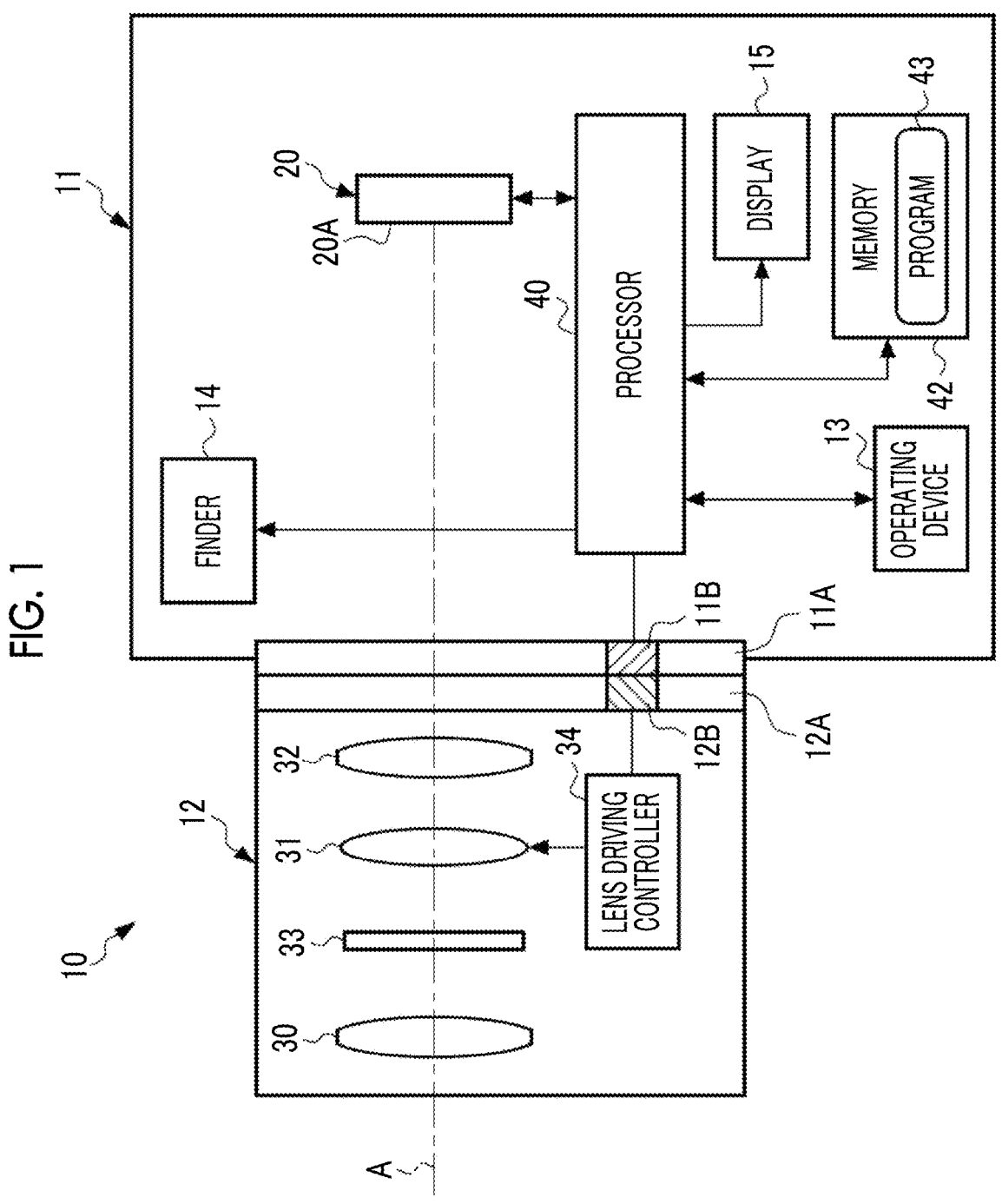
FIG. 1 is a diagram illustrating an example of a configuration of an imaging apparatus.

FIG. 1 illustrates an example of a configuration of an imaging apparatus 10. The imaging apparatus 10 is a lens-interchangeable digital camera. The imaging apparatus 10 includes a body 11 and an imaging lens 12 interchangeably mounted on the body 11. The imaging lens 12 is attached to a front surface side of the body 11 via a camera side mount 11A and a lens side mount 12A.

The body 11 is provided with an operating device 13 that includes a dial, a release button, a touch panel, and the like and receives an operation by a user. Examples of an operation mode of the imaging apparatus 10 include a still image capturing mode, a video capturing mode, and an image display mode. Further, the still image capturing mode includes a continuous imaging mode. The operating device 13 is operated by the user in a case of setting the operation mode. In addition, the operating device 13 is operated by the user in a case of starting an execution of still image capturing or video capturing. Further, the operating device 13 is operated by the user in a case where an AF area, which is a focusing target, is designated from an imaging region.

Further, the body 11 is provided with a finder 14. Here, the finder 14 is a hybrid finder (registered trademark). The hybrid finder refers to, for example, a finder in which an optical view finder (hereinafter, referred to as "OVF") and an electronic view finder (hereinafter, referred to as "EVF") are selectively used. The user can observe an optical image or a live view image of a subject projected onto the finder 14 via a finder eyepiece portion (not illustrated).

In addition, a display 15 is provided on a rear surface side of the body 11. The display 15 displays an image based on an image signal obtained through imaging, various menu screens, and the like. The user can also observe the live view image projected onto the display 15 instead of the finder 14.

The body 11 and the imaging lens 12 are electrically connected to each other through contact between an electrical contact 11B provided on the camera side mount 11A and an electrical contact 12B provided on the lens side mount 12A.

The imaging lens 12 includes an objective lens 30, a focus lens 31, a rear end lens 32, and a stop 33. Respective members are arranged in the order of the objective lens 30, the stop 33, the focus lens 31, and the rear end lens 32 from an objective side along an optical axis A of the imaging lens 12. The objective lens 30, the focus lens 31, and the rear end lens 32 constitute an imaging optical system. The type, number, and arrangement order of the lenses constituting the imaging optical system are not limited to the example illustrated in FIG. 1.

In addition, the imaging lens 12 includes a lens driving unit 34. The lens driving unit 34 includes, for example, a CPU, a RAM, a ROM, and the like. The lens driving unit 34 is electrically connected to a processor 40 inside the body 11 via the electrical contact 12B and the electrical contact 11B.

The lens driving unit 34 drives the focus lens 31 and the stop 33 based on a control signal transmitted from the processor 40. The lens driving unit 34 performs driving control of the focus lens 31 based on a control signal for focusing control transmitted from the processor 40 in order to adjust a focusing position FP of the imaging lens 12. The processor 40 performs, for example, a phase-difference-type focusing position detection.

The stop 33 has an opening in which an opening diameter is variable with the optical axis A as a center. The lens driving unit 34 performs driving control of the stop 33 based on a control signal for stop adjustment that is transmitted from the processor 40, in order to adjust an amount of light incident on a light-receiving surface 20A of an imaging sensor 20.

Further, the imaging sensor 20, the processor 40, and a memory 42 are provided inside the body 11. The operations of the imaging sensor 20, the memory 42, the operating device 13, the finder 14, and the display 15 are controlled by the processor 40.

The processor 40 is configured by, for example, a CPU. In this case, the processor 40 executes various types of processing based on a program 43 stored in the memory 42. Note that the processor 40 may be configured by an assembly of a plurality of IC chips. The processor 40 and the memory 42 constitute a focusing control device.

The imaging sensor 20 is, for example, a CMOS-type image sensor. The imaging sensor 20 is disposed such that the optical axis A is orthogonal to the light-receiving surface 20A and the optical axis A is located at the center of the light-receiving surface 20A. Light passing through the imaging lens 12 is incident on the light-receiving surface 20A. A plurality of pixels for generating signals through photoelectric conversion are formed on the light-receiving surface 20A. The imaging sensor 20 generates and outputs an image signal D by photoelectrically converting the light incident on each pixel. Note that the imaging sensor 20 is an example of an "imaging element" according to the technology of the present disclosure.

In addition, for example, a color filter array of a Bayer array is disposed on the light-receiving surface 20A of the imaging sensor 20, and a color filter of any one of red (R), green (G), or blue (B) is disposed to face each pixel. Note that some of the plurality of pixels arranged on the light-receiving surface 20A of the imaging sensor 20 may be phase difference detection pixels for detecting a phase difference related to focusing control.

Figure 2:
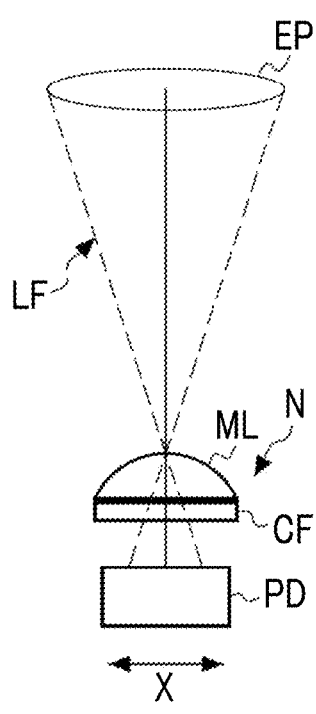
FIG. 2 is a diagram illustrating an example of a configuration of an imaging pixel.
Figure 3:
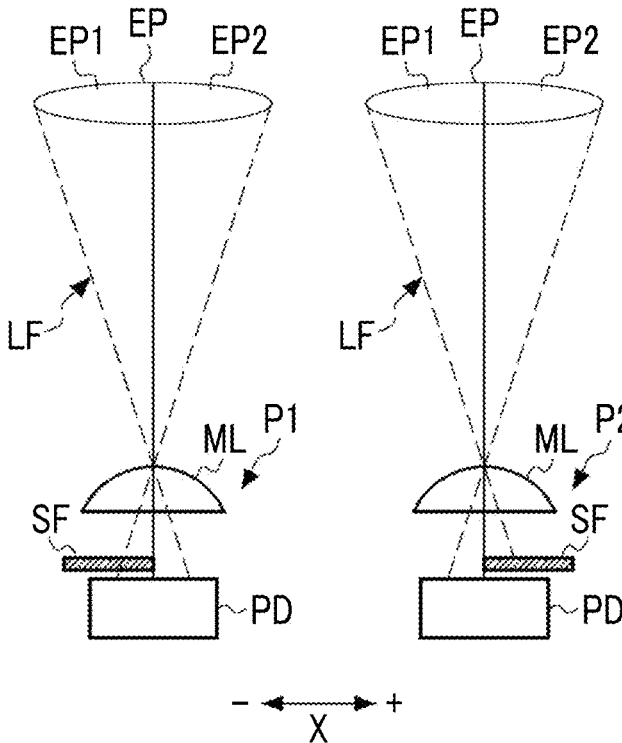
FIG. 3 is a diagram illustrating an example of a configuration of a phase difference detection pixel.

FIG. 2 illustrates an example of a configuration of an imaging pixel N. FIG. 3 illustrates an example of configurations of phase difference detection pixels P1 and P2. Each of the phase difference detection pixels P1 and P2 receives one of rays of luminous flux split in an X direction with a main light ray as the center. Hereinafter, a direction orthogonal to the X direction will be referred to as a Y direction. In addition, the X direction corresponds to a horizontal direction, and the Y direction corresponds to a vertical direction. The phase difference detection pixels P1 and P2 are an example of "phase difference pixels" according to the technology of the present disclosure.

As illustrated in FIG. 2, the imaging pixel N includes a photodiode PD serving as a photoelectric conversion element, a color filter CF, and a microlens ML. The color filter CF is disposed between the photodiode PD and the microlens ML.

The color filter CF is a filter that transmits light of any of R, G, or B. The microlens ML converges a luminous flux LF incident from an exit pupil EP of the imaging lens 12 to substantially the center of the photodiode PD via the color filter CF.

As illustrated in FIG. 3, each of the phase difference detection pixels P1 and P2 includes a photodiode PD, a light shielding layer SF, and a microlens ML. The microlens ML converges, similarly to the imaging pixel N, the luminous flux LF incident from the exit pupil EP of the imaging lens 12 to substantially the center of the photodiode PD.

The light shielding layer SF is formed of a metal film or the like and is disposed between the photodiode PD and the microlens ML. The light shielding layer SF blocks a part of the luminous flux LF incident on the photodiode PD via the microlens ML.

In the phase difference detection pixel P1, the light shielding layer SF blocks light on a negative side in the X direction with the center of the photodiode PD as a reference. That is, in the phase difference detection pixel P1, the light shielding layer SF makes the luminous flux LF from a negative side exit pupil EP1 incident on the photodiode PD, and blocks the luminous flux LF from a positive side exit pupil EP2 in the X direction.

In the phase difference detection pixel P2, the light shielding layer SF blocks light on a positive side in the X direction with the center of the photodiode PD as a reference. That is, in the phase difference detection pixel P2, the light shielding layer SF makes the luminous flux LF from the positive side exit pupil EP2 incident on the photodiode PD, and blocks the luminous flux LF from the negative side exit pupil EP1 in the X direction.

That is, the phase difference detection pixel P1 and the phase difference detection pixel P2 have mutually different light shielding positions in the X direction. A phase difference detection direction of the phase difference detection pixels P1 and P2 is the X direction (that is, the horizontal direction).

Figure 4:
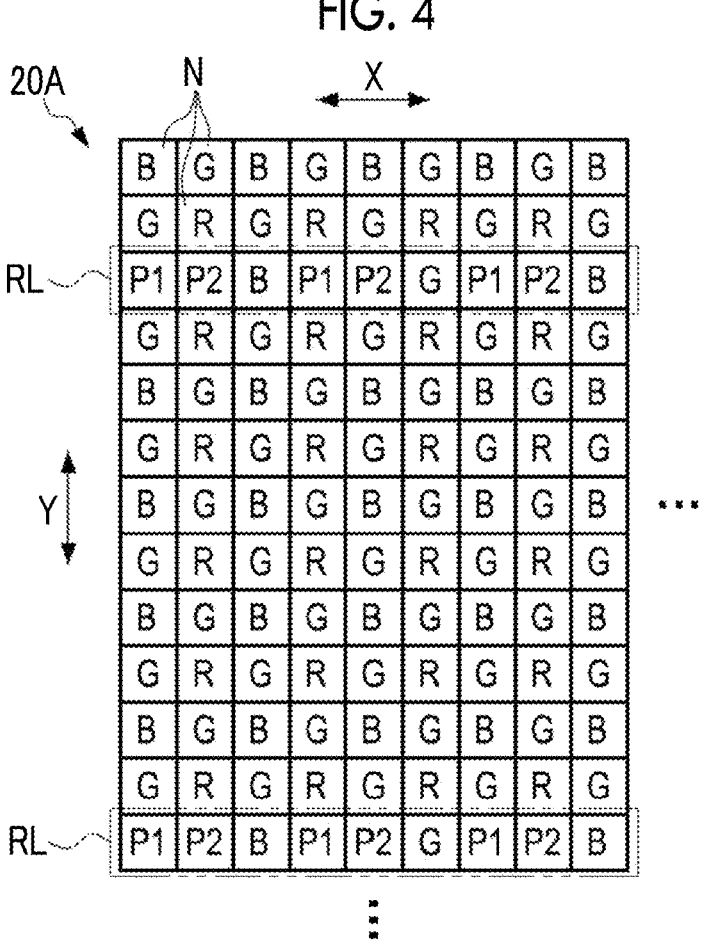
FIG. 4 is a diagram illustrating an example of pixel arrangement of an imaging sensor.

FIG. 4 illustrates an example of pixel arrangement of the imaging sensor 20. "R" in FIG. 4 indicates the imaging pixel N provided with the color filter CF of R. "G" indicates the imaging pixel N provided with the color filter CF of G "B" indicates the imaging pixel N provided with the color filter CF of B. Note that the color arrangement of the color filter CF is not limited to the Bayer array and may be another color arrangement.

Rows RL including the phase difference detection pixels P1 and P2 are arranged every 10 pixels in the Y direction. In each row RL, a pair of phase difference detection pixels P1 and P2 and one imaging pixel N are repeatedly arranged in the Y direction. Note that an arrangement pattern of the phase difference detection pixels P1 and P2 is not limited to the example illustrated in FIG. 4. For example, a pattern in which a plurality of phase difference detection pixels are disposed in one microlens ML as illustrated in FIG. 5 attached to JP2018-56703A may be used.

Figure 5:
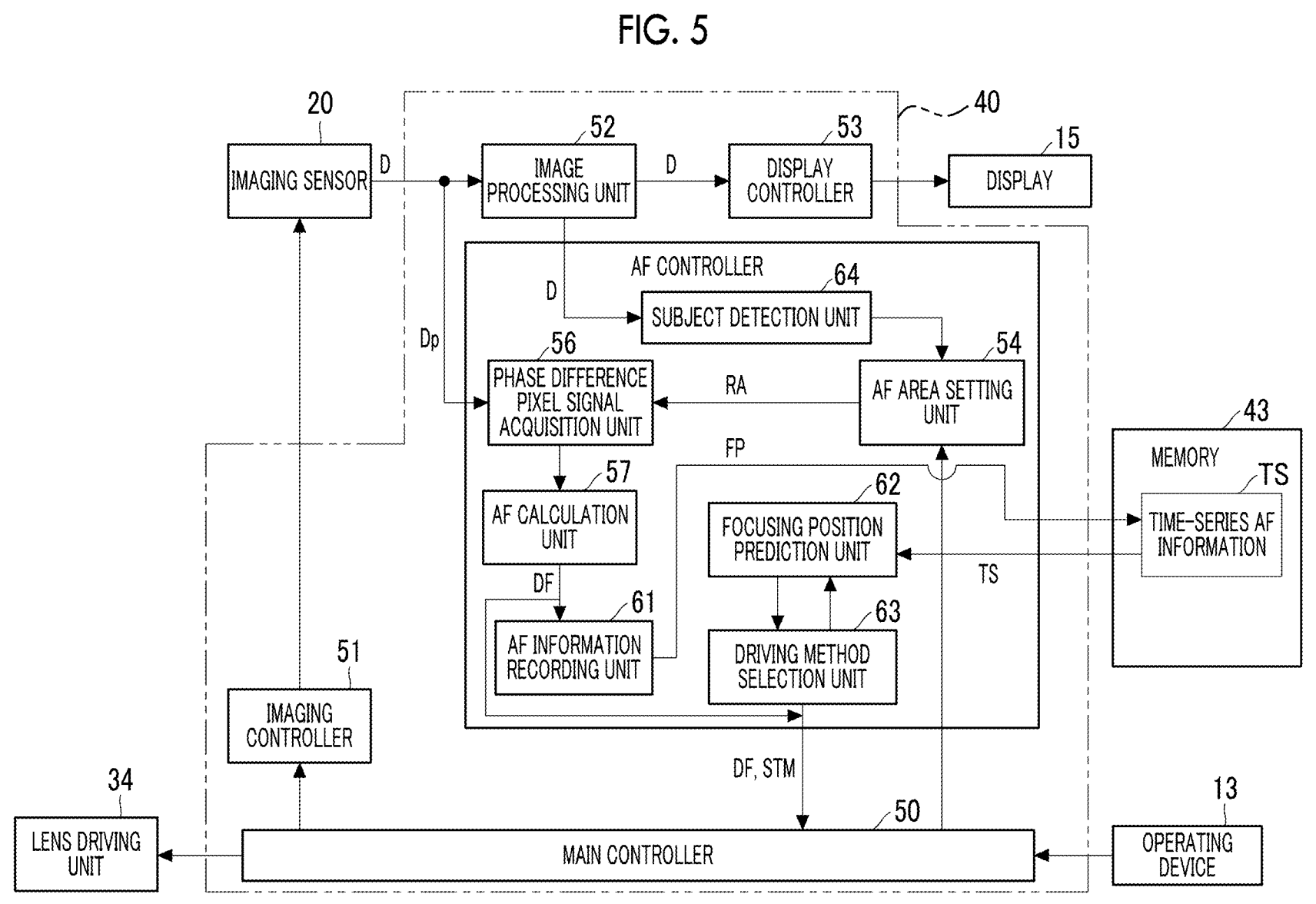

FIG. 5 illustrates an example of a functional configuration of the processor 40. The processor 40 implements various functional units by executing processing according to the program 43 stored in the memory 42. As illustrated in FIG. 5, for example, a main controller 50, an imaging controller 51, an image processing unit 52, a display controller 53, and an AF controller 55 are realized in the processor 40.

The main controller 50 comprehensively controls the operation of the imaging apparatus 10 based on output information from the operating device 13. The imaging controller 51 executes imaging processing of causing the imaging sensor 20 to perform an imaging operation by controlling the imaging sensor 20. The imaging controller 51 drives the imaging sensor 20 in the still image capturing mode or the video capturing mode.

The imaging sensor 20 outputs an image signal D including an imaging signal generated by the imaging pixels N and a phase difference pixel signal generated by the phase difference detection pixels P1 and P2.

The image processing unit 52 acquires the image signal D output from the imaging sensor 20, and performs image processing such as demosaicing on the acquired image signal D.

The display controller 53 causes the display 15 to display an image represented by the image signal D obtained by performing the image processing by the image processing unit 52. In addition, the display controller 53 causes the display 15 to perform display of the live view image based on the image signal D that is periodically input from the image processing unit 52 during an imaging preparation operation before the still image capturing or the video capturing. Further, the display controller 53 can also cause the display 15 to perform display of a post-view image for displaying the captured main image after main exposure.

The AF controller 55 performs focusing control by adjusting the focus lens 31 to the focusing position FP. The AF controller 55 includes an AF area setting unit 54, a phase difference pixel signal acquisition unit 56, an AF calculation unit 57, an AF information recording unit 61, a focusing position prediction unit 62, a driving method selection unit 63, and a subject detection unit 64.

The AF area setting unit 54 sets an AF area RA that is a region to be focused in the imaging region 20B. For example, as illustrated in FIG. 6, the AF area setting unit 54 sets, as an AF area RA, a region including the subject detected as a focusing target by the subject detection unit 64.

The subject detection unit 64 recognizes a subject based on the image signal D by using an image recognition technology based on a pattern matching method or an artificial intelligence (AI) method. Examples of the subject to be recognized include a face of a person, an animal, an automobile, and an airplane. The subject detection unit 64 can continuously perform detection of the subject, for example, in a case where the user performs framing by checking the composition while half-pushing the release button, or in a case where the user performs continuous imaging for continuously capturing a plurality of images while fully-pushing the release button. Thereby, even in a case where the subject moves, it is possible to track the AF area RA. The subject detection unit 64 continuously outputs information of the AF area RA that moves according to the movement of the subject, to the AF area setting unit 54.

Figure 6:
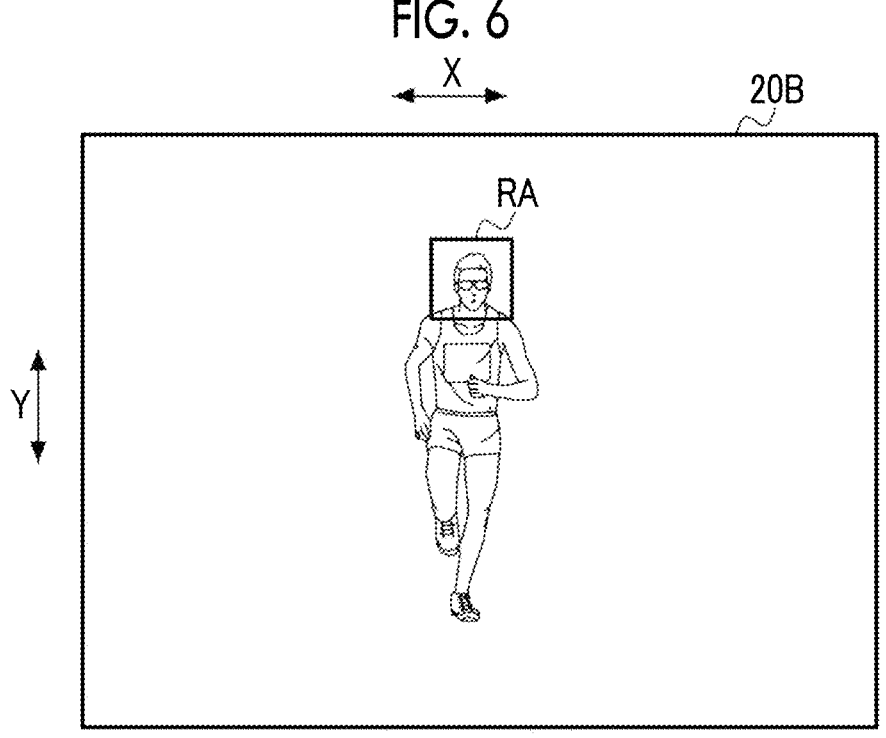
FIG. 6 is a diagram illustrating an example of an AF area.

In the example illustrated in FIG. 6, the subject is a person who is running, and the AF area RA is set as a rectangular region including a face of the person detected by the subject detection unit 64.

In addition, the AF area setting unit 54 can also set, as the AF area RA, a region designated by the user via the operating device 13. For example, the operating device 13 is a touch panel provided on a display surface of the display 15, and the user can designate the AF area RA by touching the touch panel with a finger.

The phase difference pixel signal acquisition unit 56 acquires phase difference pixel signals Dp in the AF area RA from the image signal D output from the imaging sensor 20. The phase difference pixel signals Dp are pixel values of the phase difference detection pixels P1 and P2.

The AF calculation unit 57 calculates a defocus amount DF in the AF area RA by performing correlation calculation based on the phase difference detection pixels P1 and P2 in the AF area RA. The defocus amount DF represents a deviation amount from the focusing position FP, and the main controller 50 adjusts the focusing position FP by driving the focus lens 31 via the lens driving unit 34 based on the defocus amount DF. Thereby, the subject in the AF area RA is in a focused state.

Figure 7:
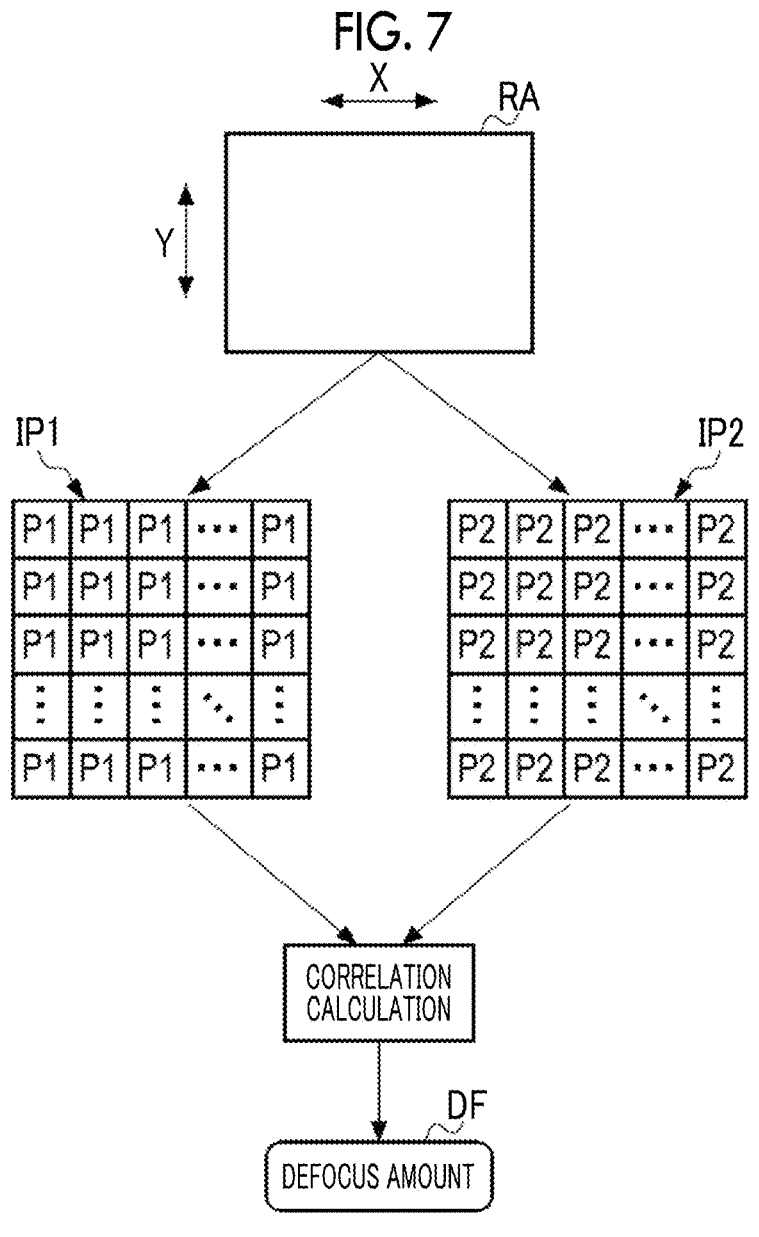
FIG. 7 is a diagram illustrating an example of correlation calculation processing.

FIG. 7 illustrates an example of correlation calculation processing. The AF calculation unit 57 calculates the defocus amount DF by performing correlation calculation using a first image IP1 including signals of a plurality of phase difference detection pixels P1 and a second image IP2 including signals of a plurality of phase difference detection pixels P2, the phase difference detection pixels P1 and P2 being included in the block BL.

Figure 8:
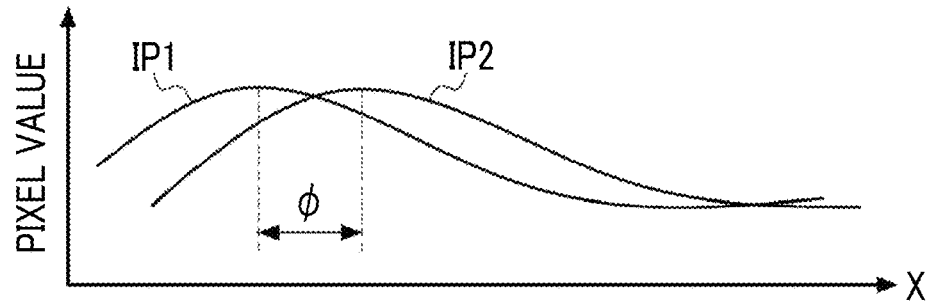
FIG. 8 is a diagram illustrating details of correlation calculation processing.

FIG. 8 illustrates details of the correlation calculation processing. For simplification of the description, in FIG. 8, the first image IP1 and the second image IP2 are illustrated as one-dimensional waveforms in the X direction. As a method of obtaining a correlation amount between the first image IP1 and the second image IP2, a known method can be adopted. For example, an integrated value (hereinafter, referred to as a "difference-integrated value") of an absolute value of a difference between each point IP1 (X, Y) of the first image IP1 and each point IP2 (X+φ, Y) of the second image IP2 is calculated.

Figure 9:
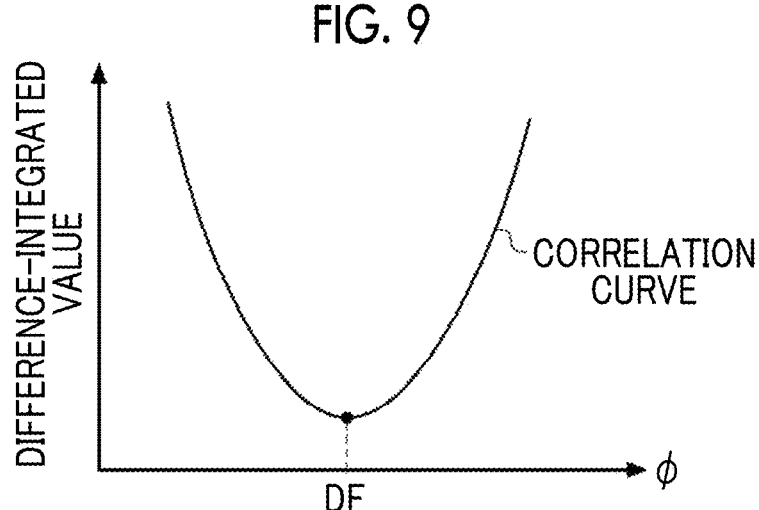
FIG. 9 is a diagram illustrating an example of a correlation curve.

FIG. 9 illustrates an example of a correlation curve representing a relationship between a correlation amount and a phase difference φ of the first image IP1 and the second image IP2.

Specifically, FIG. 9 is a correlation curve representing a relationship between the difference-integrated value and the phase difference φ. The AF calculation unit 57 calculates a phase difference φ at which the difference-integrated value is a minimum (that is, the correlation amount is a maximum) as the defocus amount DF.

In a case of normal still image capturing in which one main image is captured by a single fully-pushing operation of the release button, the focusing control is performed by using the defocus amount DF as AF information. On the other hand, in a case of continuous imaging in which a plurality of main images are continuously captured while the release button is fully pushed, focusing control is performed by predicting a focusing position FP and using a predicted value of the predicted focusing position FP as the AF information. This is because, in a case where the subject moves during the continuous imaging, unless focusing control of predicting the movement of the subject is performed, it is not possible to track the focusing position FP due to the movement of the subject.

The AF controller 55 uses time-series AF information TS to predict the focusing position FP. The AF information recording unit 61 records the time-series AF information TS based on the defocus amount DF output by the AF calculation unit 57. The time-series AF information TS is history information representing a temporal change of the AF information. The AF information includes, in addition to the defocus amount DF, the focusing position FP (refer to FIG. 10) of the focus lens 31 that is calculated from the defocus amount DF, and the like. The AF information recording unit 61 calculates the focusing position FP according to the defocus amount DF each time the defocus amount DF is output from the AF calculation unit 57, and records the calculated focusing position FP in the memory 42. Information obtained by collecting the focusing positions FP in time series is the time-series AF information TS (refer to FIG. 10). The AF information recording unit 61 adds the focusing position FP as the AF information to the time-series AF information TS each time the AF calculation unit 57 outputs the defocus amount DF. Thereby, the time-series AF information TS is updated.

The AF calculation unit 57 calculates at least one defocus amount DF in a frame period of the imaging, and outputs the defocus amount DF as the AF information. The frame period of the imaging is a period in which the main image is captured by the operation of the release button in a case of the normal imaging. On the other hand, in a case of the continuous imaging, as an example, a period from a preparation operation of the main exposure for capturing the main image to a next preparation operation of the main exposure is set as one frame period. In a case of the normal imaging, one main image is captured by a one-time fully-pushing operation of the release button. Thus, one frame period is a period from when a one-time fully-pushing operation of the release button is performed to when the capturing of the main image is ended. On the other hand, in a case of the continuous imaging, one frame period is determined according to a continuous imaging interval according to a preset frame rate. The frame rate is, for example, several frames/second to several tens of frames/second. In a case of the continuous imaging, the AF calculation unit 57 outputs one piece of AF information for each frame period, and the AF information recording unit 61 updates the time-series AF information TS for each frame period.

Figure 10:
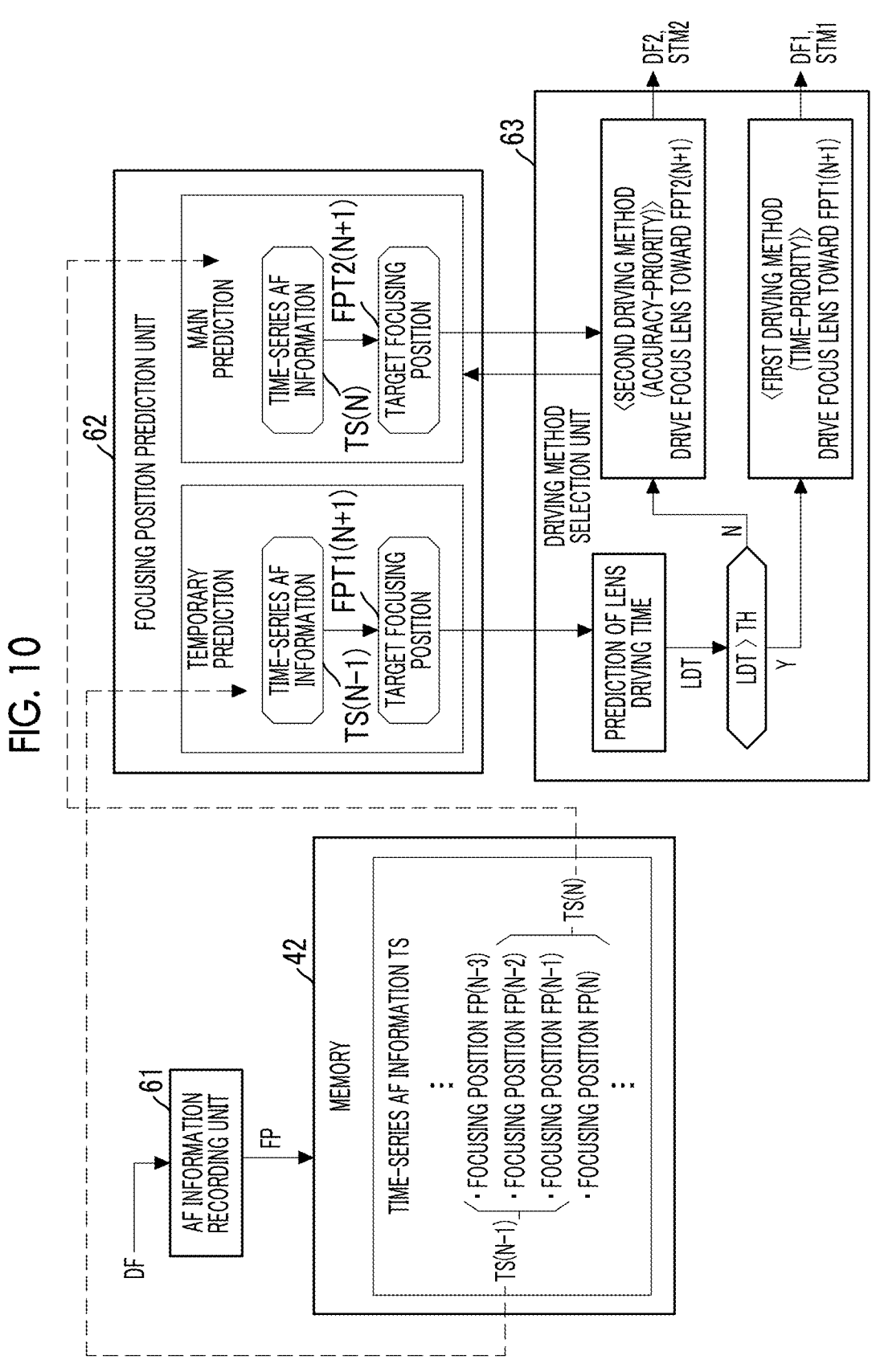
FIG. 10 is a diagram illustrating processing of a focusing position prediction unit and a driving method selection unit.

As illustrated in FIG. 10, the focusing position prediction unit 62 predicts the focusing position FP according to the movement of the subject based on the time-series AF information TS. The focusing position prediction unit 62 performs temporary prediction and main prediction by using pieces of time-series AF information TS different from each other. The time-series AF information TS is information which includes the focusing position FP in the current frame period as the latest AF information and includes a plurality of focusing positions FP in a plurality of previous frame periods as a plurality of pieces of previous AF information. As illustrated in FIG. 10, in a case where the current frame is the N-th frame period, the focusing position FP(N) in the N-th frame period is the latest AF information. In addition, the focusing position FP(N−1) in the (N−1)-th frame period is the AF information in a frame period which is one frame before, and the focusing position FP(N−2) in the (N−2)-th frame period and the focusing position FP(N−3) in the (N−3)-th frame period are respectively the AF information in a frame period which is two frames before and the AF information in a frame period which is three frames before.

In addition, the time-series AF information TS(N) is information in which the focusing position (N) in the N-th frame period which is the current frame period is included as the latest AF information, and is an example of "second time-series AF information" according to the technology of the present disclosure. On the other hand, the time-series AF information TS(N−1) is information in which the focusing position (N−1) in the (N−1)-th frame period is included as the latest AF information, and is an example of "first time-series AF information" according to the technology of the present disclosure.

The focusing position prediction unit 62 predicts, as the temporary prediction, in the N-th frame period, the target focusing position FPT1(N+1) in the (N+1)-th frame period based on the time-series AF information (N−1) in which the focusing position FP(N−1) obtained in the (N−1)-th frame period is included as the AF information. Further, in the N-th frame period, the focusing position prediction unit 62 predicts, as the main prediction, the target focusing position FPT2(N+1) in the (N+1)-th frame period based on the time-series AF information (N−1) in which the focusing position FP(N) obtained in the N-th frame period is included as the AF information. The time-series AF information TS, which is a basis for the prediction, is different between the temporary prediction and the main prediction, but the prediction target is the same. That is, the prediction target is a future target focusing position FPT(N+1) in a frame period which is one frame after with respect to the N-th frame period as a reference. As described above, the prediction target is the same in the case of the temporary prediction and the case of the main prediction. However, the time-series AF information TS, which is a basis for the prediction, is different. For this reason, in the case of the temporary prediction, the target focusing position FPT (N+1) is distinguished as the target focusing position FPT1 (N+1), and in the case of the main prediction, the target focusing position FPT (N+1) is distinguished as the target focusing position FPT2 (N+1). The target focusing position FPT1(N+1) of the temporary prediction is an example of a "first target focusing position" according to the technology of the present disclosure, and the target focusing position FPT2(N+1) of the main prediction is an example of a "second target focusing position" according to the technology of the present disclosure.

The driving method selection unit 63 predicts a lens driving time LDT for moving the focus lens 31 to the target focusing position FPT1(N+1) based on the target focusing position FPT1(N+1) predicted by the temporary prediction. In addition, the driving method selection unit 63 selects a driving method of the focus lens 31 that is to be executed in the N-th frame period, based on the predicted lens driving time LDT. The driving method of the focus lens 31 that is to be executed in the N-th frame period is a driving method that is to be executed in the N-th frame period in order to move the focus lens 31 to the focusing position FP at a timing of the main exposure in the (N+1)-th frame period.

In a case where the predicted lens driving time LDT is longer than the preset threshold value TH, the driving method selection unit 63 selects a first driving method as the driving method. In a case where the predicted lens driving time LDT is equal to or shorter than the preset threshold value TH, the driving method selection unit 63 selects a second driving method as the driving method.

The first driving method is a method of starting the driving of the focus lens 31 toward the target focusing position FPT1(N+1) that is a prediction value of the temporary prediction without performing the main prediction. Since the first driving method does not perform the main prediction, the first driving method is a driving method in which the lens driving time LDT can be secured for a long time, and is a driving method suitable for a subject that moves at a high speed. The first driving method can be said to be a time-priority driving method. From the viewpoint of the object, the first driving method is a driving method of starting the driving of the focus lens 31 toward the target focusing position FPT1 in the N-th frame period at a timing when the focusing control in the (N+1)-th frame period is in time. In addition, from the viewpoint of a timing when starting the driving of the focus lens 31, the first driving method is a driving method of starting the driving of the focus lens 31 toward the first target focusing position before acquiring the AF information (for example, the defocus amount DF or the focusing position FP(N+1)) in the N-th frame period.

On the other hand, the second driving method is a driving method of performing the main prediction after the temporary prediction. Specifically, the second driving method predicts the target focusing position FPT2(N+1) in the (N+1)-th frame period based on the time-series AF information TS(N) in which the focusing position FP(N) in the N-th frame period is included as the AF information. In addition, the second driving method starts the driving of the focus lens 31 toward the predicted target focusing position FPT2(N+1). That is, the second driving method is an accuracy-priority driving method that can perform focusing control with high accuracy, although the lens driving time is shorter than that in the first driving method, since the second driving method is used to perform the main prediction. The second driving method is a driving method suitable for a case of a subject having a slow movement.

In a case where the first driving method is selected, the driving method selection unit 63 outputs the defocus amount DF1 according to the target focusing position FPT1(N+1) and a driving start timing signal STM1. On the other hand, in a case where the second driving method is selected, the driving method selection unit 63 outputs the defocus amount DF2 according to the target focusing position FPT2(N+1) and a driving start timing signal STM2.

The driving start timing signal STM1 and the driving start timing signal STM2 are an example of a driving start timing signal STM illustrated in FIG. 5.

In the imaging apparatus 10, the configuration including the processor 40 that functions as the AF controller 55 is an example of a "focusing control device" according to the technology of the present disclosure.

The prediction of the focusing position FP using the time-series AF information TS that is performed by the AF controller 55, and the first driving method and the second driving method will be described in more detail with reference to FIG. 11 to FIG. 18.

Figure 11:
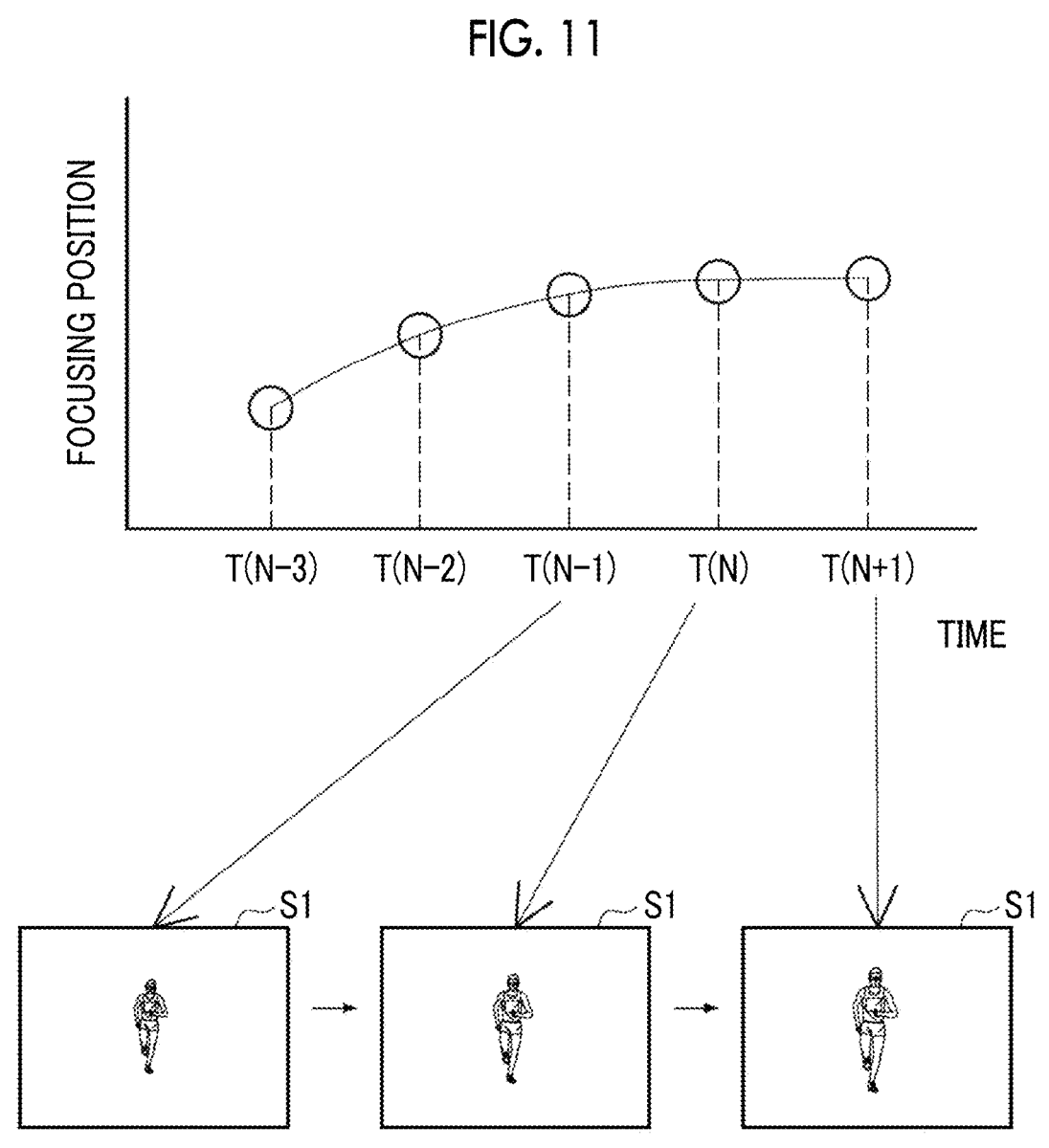

A subject S1 illustrated in FIG. 11 is a person who is running, and is an example of a subject that moves in a direction of gradually approaching a user who is being imaged by the imaging apparatus 10. The subject S1 that moves in this way has a subject distance that changes every moment, and the focusing position FP also changes according to the change. As an example, as illustrated in FIG. 11, a graph in which the focusing position FP gradually increases from a timing T(N−3) to a timing T(N) of the current frame period is obtained. The time-series AF information TS is history information indicating a temporal change of the focusing position FP.

Figure 12:
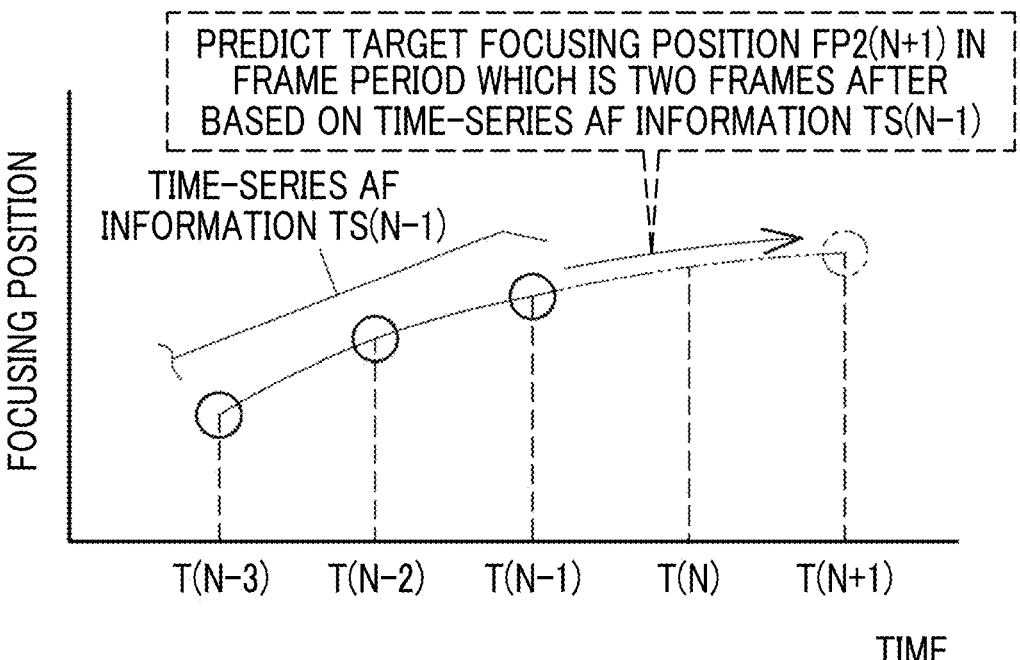
FIG. 12 is a diagram illustrating temporary prediction.
Figure 13:
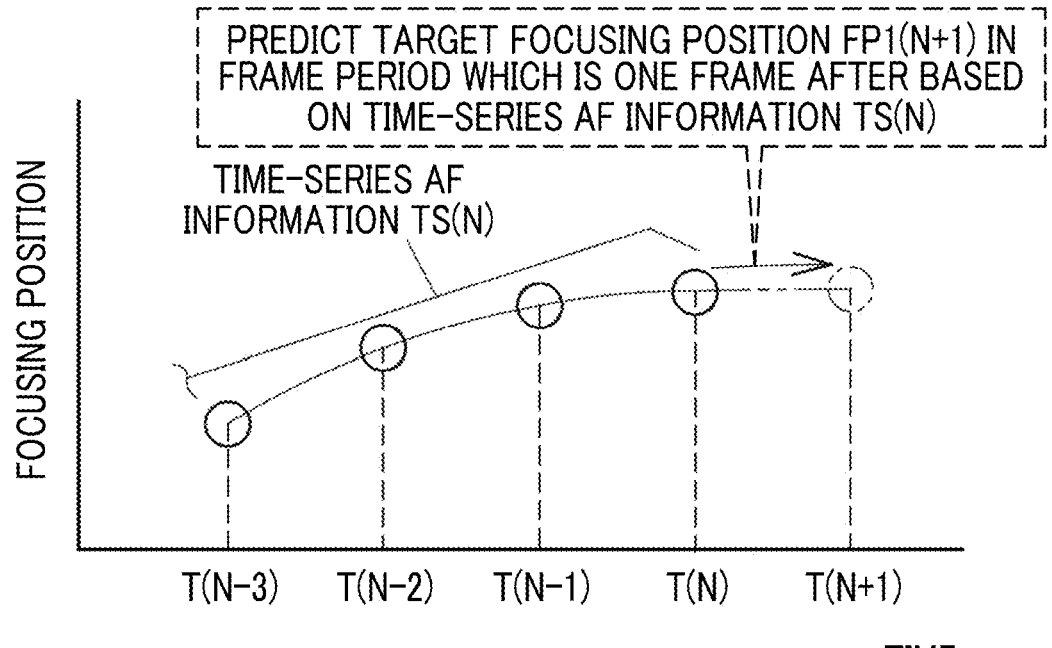
FIG. 13 is a diagram illustrating main prediction.

FIG. 12 and FIG. 13 are graphs illustrating a difference between the temporary prediction and the main prediction in the same manner as in FIG. 11. In the temporary prediction illustrated in FIG. 12, at the timing T(N) of the current frame period, the time-series AF information TS(N−1) in which the focusing position FP(N−1) in the previous frame period which is one frame before is included as the latest AF information is used. In the temporary prediction, the future target focusing position FP1(N+1) in a frame period which is two frames after is predicted based on the time-series AF information TS(N−1). Here, since the temporary prediction is performed to predict the focusing position FP(N+1) in a frame period which is two frames after, the prediction accuracy is lower than the prediction accuracy in the main prediction illustrated in FIG. 13.

On the other hand, in the main prediction illustrated in FIG. 13, at the timing T(N) of the current frame period, the time-series AF information TS(N) in which the focusing position FP(N) in the current frame period is included as the latest AF information is used. In the main prediction, the target focusing position FP2(N+1) in a frame period which is one frame after is predicted based on the time-series AF information TS(N). The main prediction has high prediction accuracy as compared with the temporary prediction, since the main prediction is performed to predict the focusing position FP(N+1) in a frame period which is one frame after.

Figure 14:
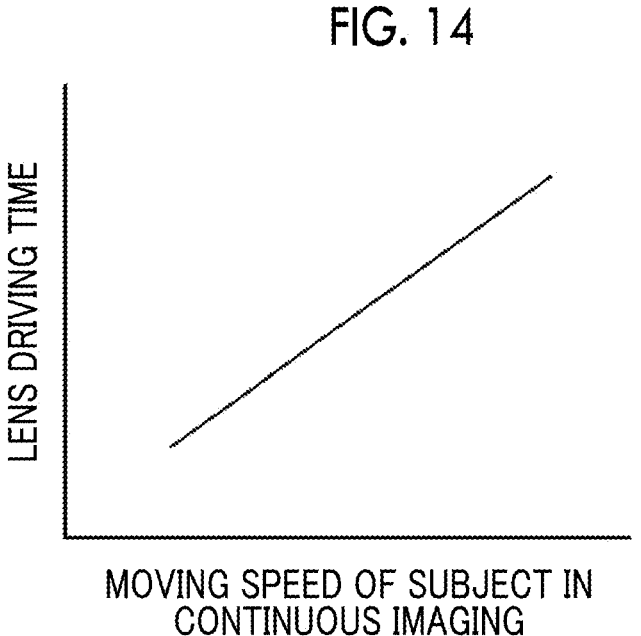
FIG. 14 is a diagram illustrating a relationship between a moving speed of a subject and a lens driving time.

As in the subject S1 illustrated in FIG. 11, in a case where the subject distance changes moment by moment, as illustrated in FIG. 14, there is a relationship that the lens driving time LDT is longer as the moving speed of the subject in the continuous imaging (that is, the speed of the change in the subject distance) is faster. In order to perform focusing control with high accuracy, as the moving speed of the subject is faster, an amount of a change of the focusing position FP per unit time increases, and thus, the driving amount of the focus lens 31 that must be moved per unit time also increases according to the amount of the change of the focusing position FP per unit time.

Figure 15:
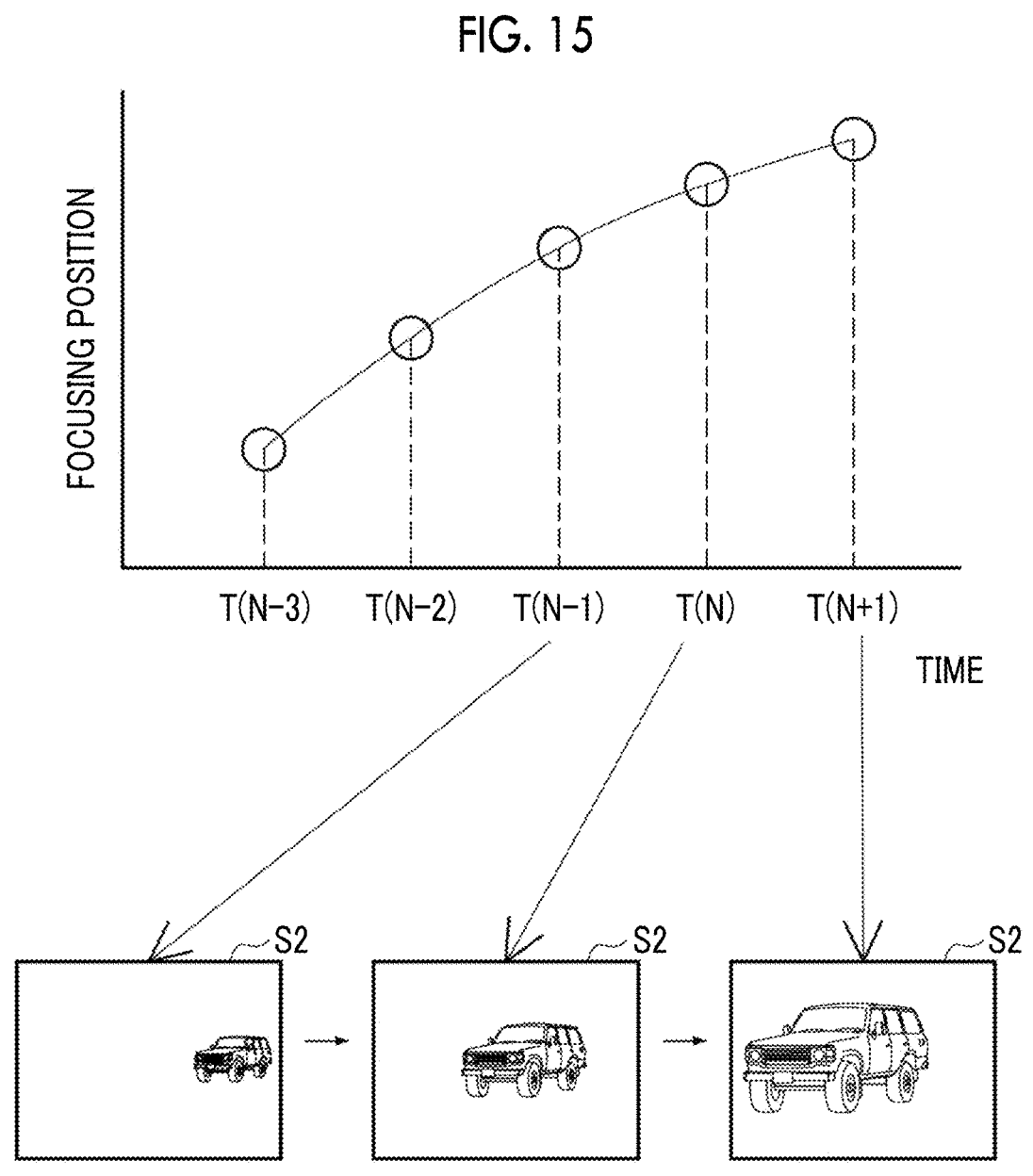

A subject S2 illustrated in FIG. 15 is an automobile, and is an example of a subject of which the subject distance changes in a direction of approaching the imaging apparatus 10, similarly to the subject S1 in FIG. 11. Since the subject S2 has a higher moving speed than the subject S1, the amount of the change of the focusing position FP per unit time is also larger, and the inclination of the graph in FIG. 15 is steeper than the inclination of the graph in FIG. 11. In a case where the continuous imaging of the subject S2 is performed, the amount of the change of the focusing position FP per unit time is larger than in a case where the continuous imaging of the subject S1 is performed. Therefore, the driving amount of the focus lens 31 that must be moved per unit time in each frame period is also larger.

As in the subject S2 illustrated in FIG. 15, in a case where the moving speed is fast, the time-priority first driving method is preferable although the accuracy of focusing is decreased. As in the subject S1 illustrated in FIG. 11, in a case where the moving speed is slow, the second driving method of which the accuracy of focusing is high is preferable because there is enough time. Therefore, the AF controller 55 predicts the lens driving time LDT according to the target focusing position FPT1(N+1) that is predicted by the temporary prediction, and selects the driving method of the focus lens 31 based on the predicted lens driving time LDT.

Figure 16:
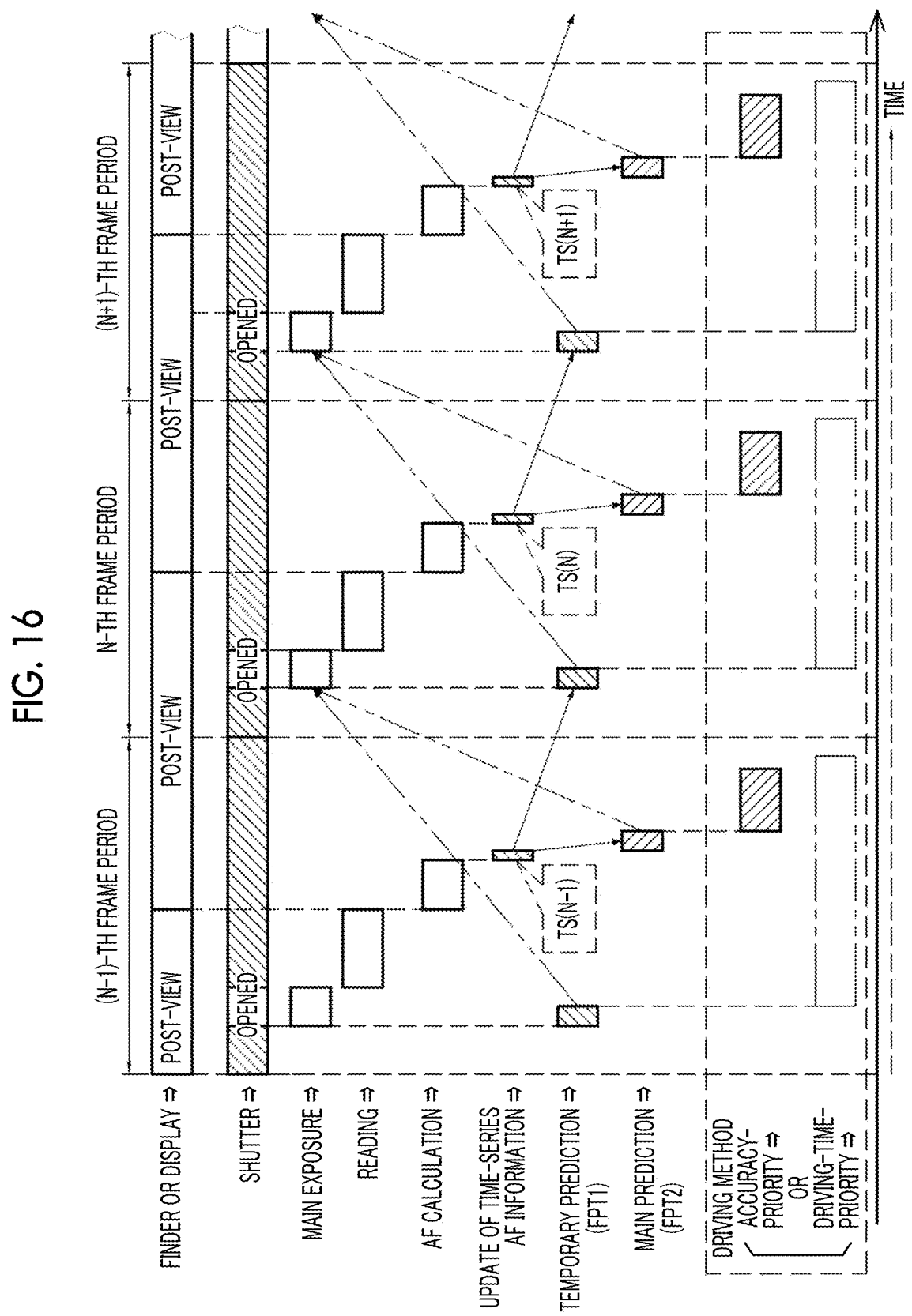
FIG. 16 is a timing chart illustrating a second driving method.
Figure 17:
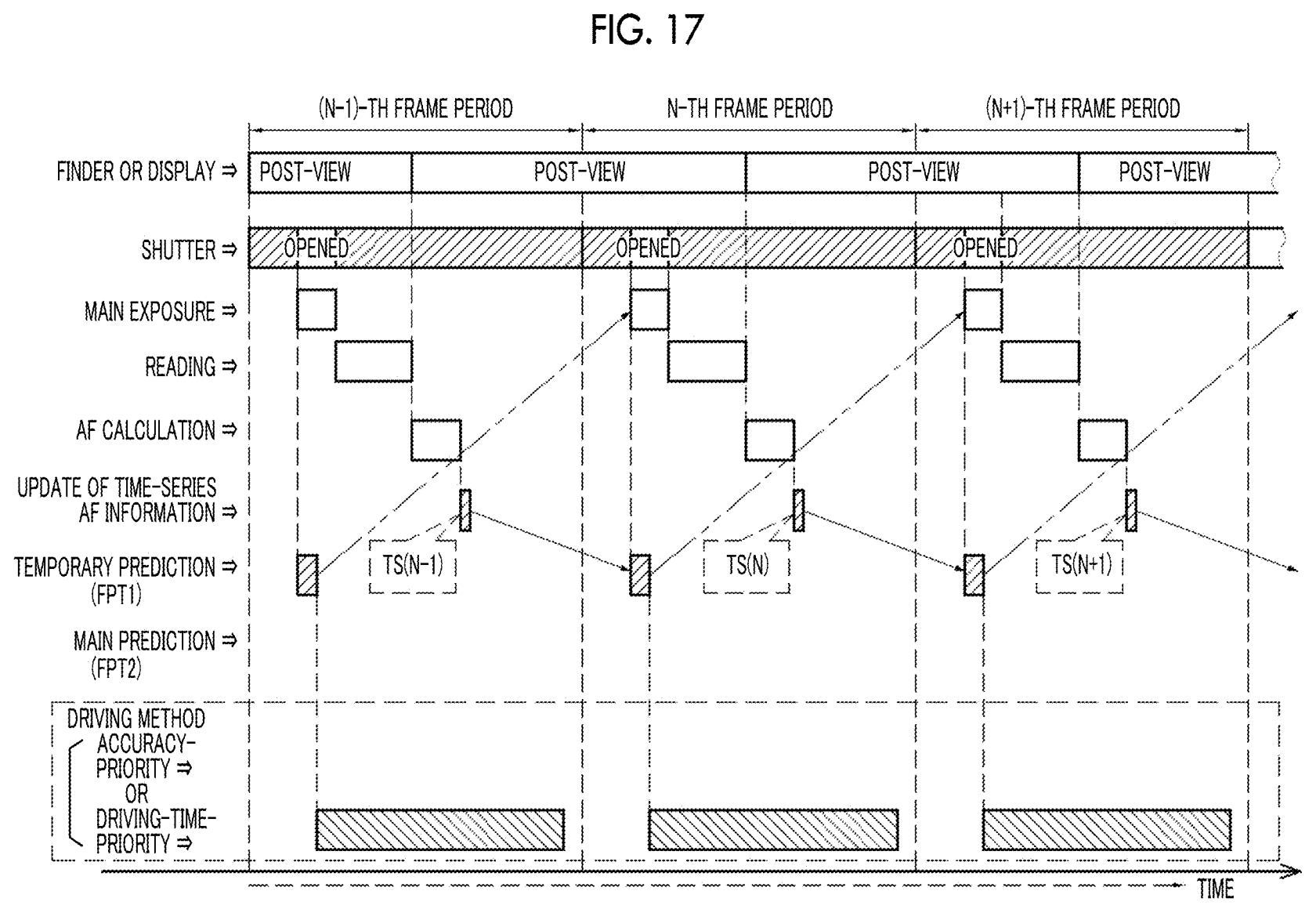
Figure 18:
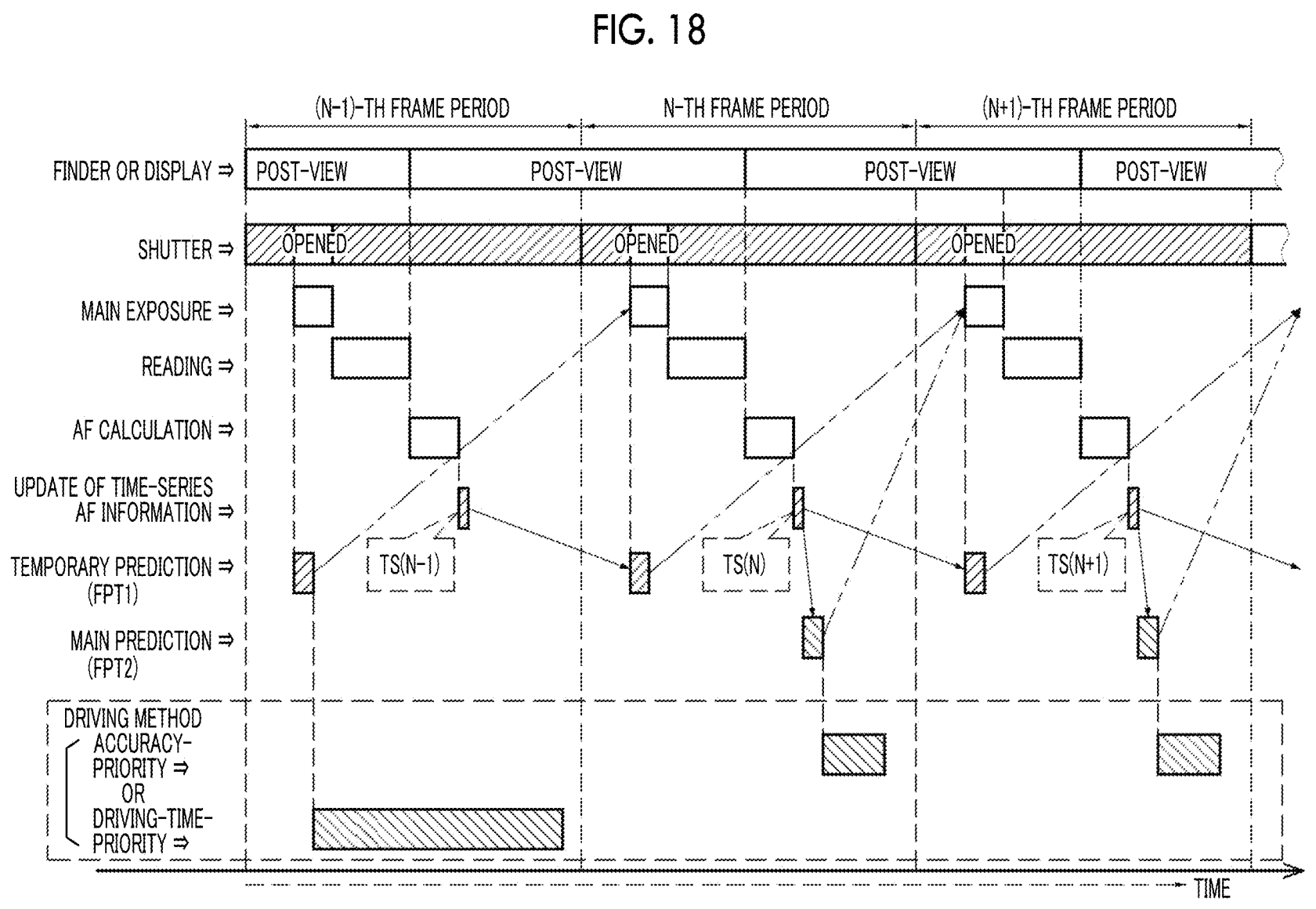

FIG. 16 to FIG. 18 are timing charts illustrating operations of each unit of the imaging apparatus 10 in a case where focusing control in the continuous imaging is performed. FIG. 16 is a timing chart in a case where the first driving method is selected as the driving method of the focus lens 31, and FIG. 17 is a timing chart in a case where the second driving method is selected as the driving method of the focus lens 31. In addition, FIG. 18 is a timing chart in a case where the first driving method and the second driving method are switched during the continuous imaging. Further, FIG. 16 to FIG. 18 are examples of performing post-view continuous imaging in which an image captured during the continuous imaging is displayed on the finder 14 or the display 15 after the imaging. In the following, an image displayed in the post-view continuous imaging will be referred to as a post-view image. As will be described later, in the continuous imaging mode, there is a live view continuous imaging in which a live view image is displayed after the main exposure (refer to FIG. 25) in addition to the post-view continuous imaging.

First, as illustrated in FIG. 16 as a representative example, each frame period is a period from a time when a preparation operation of the shutter is performed to a time when the shutter is closed after the main exposure and a preparation operation of the shutter for the next frame is started. The shutter is, for example, a mechanical shutter having a front curtain and a rear curtain, and has four states of a front-curtain closed state, a rear-curtain closed state, a fully open state, and a fully closed state as a state of the shutter. The front-curtain closed state is a state in which the front curtain is at a closed position and the rear curtain is at an open position, and the rear-curtain closed state is a state in which the rear curtain is at a closed position and the front curtain is at an open position. The fully open state is a state in which both the front curtain and the rear curtain are at the open positions. The fully closed state is a state in which both the front curtain and the rear curtain are at the closed positions. In a case of the post-view continuous imaging, the shutter is transitioned between three states of the front-curtain closed state, the rear-curtain closed state, and the fully closed state because the fully closed state is set in a case where the post-view image is displayed.

In FIG. 16, a period indicated by "open" is a period of the main exposure, and is a period in which the shutter transitions from the front-curtain closed state to the rear-curtain closed state. Specifically, in the period, the front curtain moves from the closed position to the open position, and the rear curtain moves from the open position to the closed position after the front curtain. Thus, in the period, a slit-shaped exposure aperture moves the entire area of the imaging region 20B. During the period, subject light is incident on the entire area of the imaging region 20B. An exposure time during the period is set as a shutter speed. In addition, the period before "open" that is indicated by hatching with a diagonal line is a period of the preparation operation of the shutter before the main exposure. During the period of the preparation operation, a winding operation of winding the front curtain from the open position to the closed position is performed, and the rear curtain is moved from the closed position to the open position. In a case where the main exposure is completed, the rear curtain is also wound to the closed position, and becomes fully closed state. During the period, the main image exposed by the main exposure is read out from the imaging sensor 20 (indicated as "reading" in FIG. 16 and the like). In a case where the main image is read out, the post-view image is displayed on the finder 14 or the like. The post-view image is updated each time the reading of the main image is performed in each frame period.

After the reading of the main image, AF calculation using the phase difference method is performed by the AF calculation unit 57, and the AF information is acquired. In addition, the time-series AF information TS is updated by the AF information acquired by the AF information recording unit 61. In the next frame period, the preparation operation of the shutter is started again.

In a case where it is assumed that the current frame period is the N-th frame period, the temporary prediction is performed, for example, after the N-th frame period is started and before reading of the main image is completed. In the example of FIG. 16, the temporary prediction is performed during the main exposure. In the temporary prediction, the target focusing position FPT1(N+1) in the (N+1)-th frame period is predicted based on the time-series AF information TS(N−1). A two-dot chain line arrow extending from the temporary prediction to the main exposure in the next frame period indicates that a prediction target of the temporary prediction is the target focusing position FPT1 in the main exposure in the next frame period. In addition, a solid line arrow extending from the time-series AF information TS to the temporary prediction and the main prediction indicates the time-series AF information TS which is a basis for each of the temporary prediction and the main prediction. That is, the time-series AF information TS used as a basis for the temporary prediction is the time-series AF information TS in which the AF information in a frame period which is one frame before is set as the latest information, and the time-series AF information TS used as a basis for the main prediction is the time-series AF information TS in which the AF information in a current frame period is set as the latest information.

Further, the driving method is selected based on the target focusing position FPT1 (N+1) predicted by the temporary prediction. In the example in FIG. 16, since the second driving method is selected, the main prediction is performed after the temporary prediction. In the second driving method, after the main prediction, the driving of the focus lens 31 is started toward the target focusing position FPT2 (N+1) predicted by the main prediction.

The timing chart illustrated in FIG. 17 is an example in which the first driving method is selected, and the update of the time-series AF information TS and the temporary prediction are the same as those in FIG. 16. In a case where the first driving method is selected, the main prediction is not performed, and the driving of the focus lens 31 is started toward the target focusing position FPT1(N+1) predicted by the temporary prediction.

The timing chart illustrated in FIG. 18 is basically the same as the timing charts in FIG. 16 and FIG. 17. On the other hand, in the case of the continuous imaging, in the (N−1)-th frame period, the first driving method is selected, and in the N-th frame period and the (N+1)-th frame period, the second driving method is selected.

An action according to the technique of the present disclosure will be described using the timing chart illustrated in FIG. 18, the flowchart of the focusing control in the continuous imaging illustrated in FIG. 19, and diagrams showing effects illustrated in FIG. 20 and FIG. 21.

Figure 19:
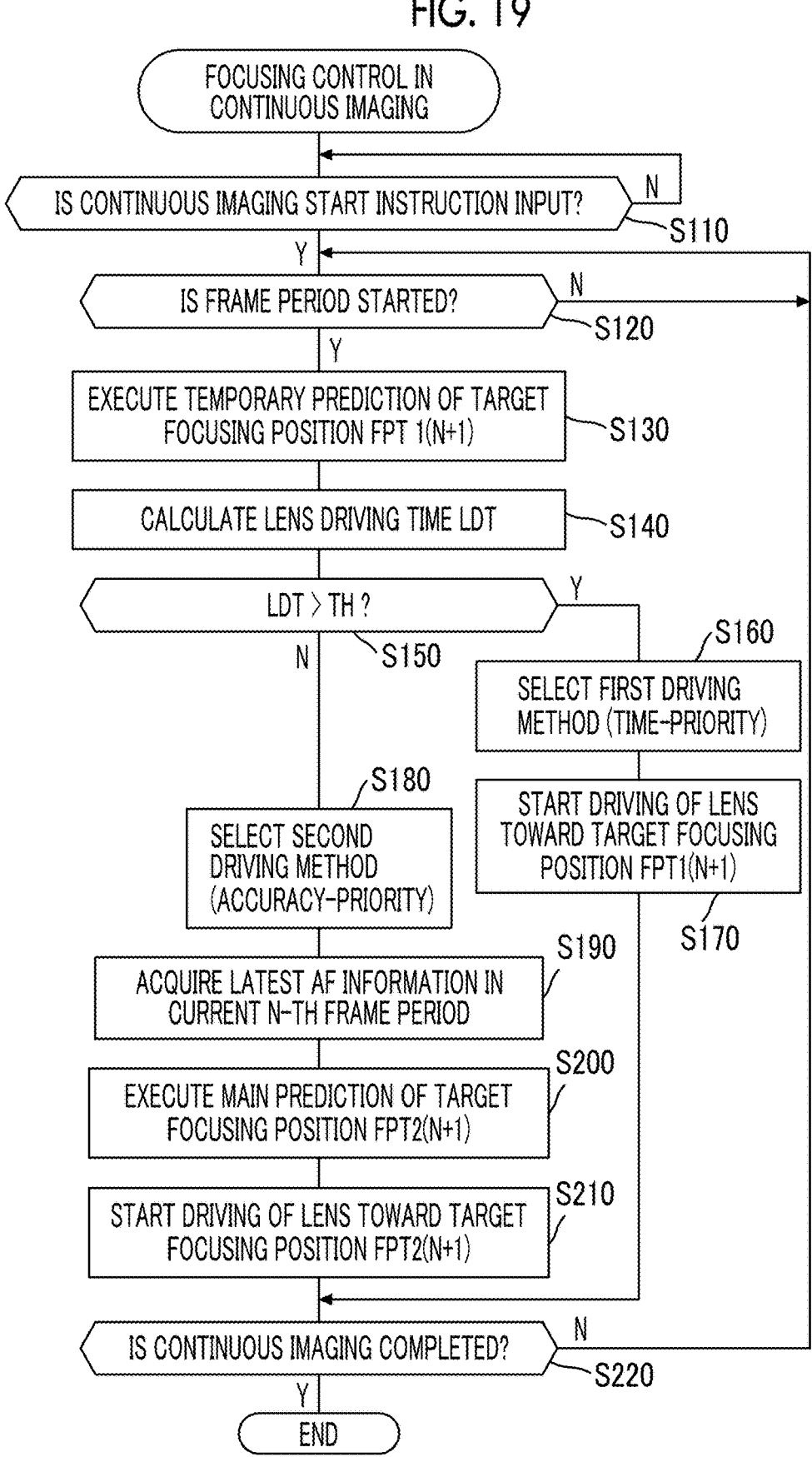
FIG. 19 is a flowchart illustrating an example of a flow of processing performed by focusing control in continuous imaging.

Assuming that the continuous imaging mode is set, in step S110 illustrated in FIG. 19, in a case where a continuous imaging start instruction is input by a fully-pushing operation of the release button, the AF controller 55 starts focusing control in the continuous imaging. In a case where the continuous imaging is started, the AF controller 55 repeatedly executes the processing illustrated in FIG. 18, such as display of the post-view, the shutter operation, the main exposure, the reading, the AF calculation, and the update of the time-series AF information TS, based on the frame rate of the continuous imaging mode.

In step S120, in a case where one frame period (N) is started (Y in step S120) and an opening operation of the shutter is started as illustrated in FIG. 18, the main exposure is started. At this timing, the AF controller 55 executes the temporary prediction of the target focusing position FPT1 (N+1) based on the time-series AF information TS(N−1) in a frame period (N−1) which is one frame before, the time-series AF information TS(N−1) being read out from the memory 42 (step S130).

In step S140, the AF controller 55 calculates the lens driving time LDT for which the focus lens 31 is moved from the current position to the target focusing position FPT1(N+1) based on the target focusing position FPT1(N+1) that is predicted by the temporary prediction.

Thereby, the lens driving time LDT is predicted.

In step S150, the AF controller 55 compares the calculated lens driving time LDT with a threshold value TH. In a case where the lens driving time LDT is longer than the threshold value TH (Y in step S150), the AF controller 55 transitions to step S160, and selects the time-priority first driving method. In addition, the AF controller 55 transitions to step S170, and starts driving of the focus lens 31 toward the target focusing position FPT1(N+1).

Figure 20:
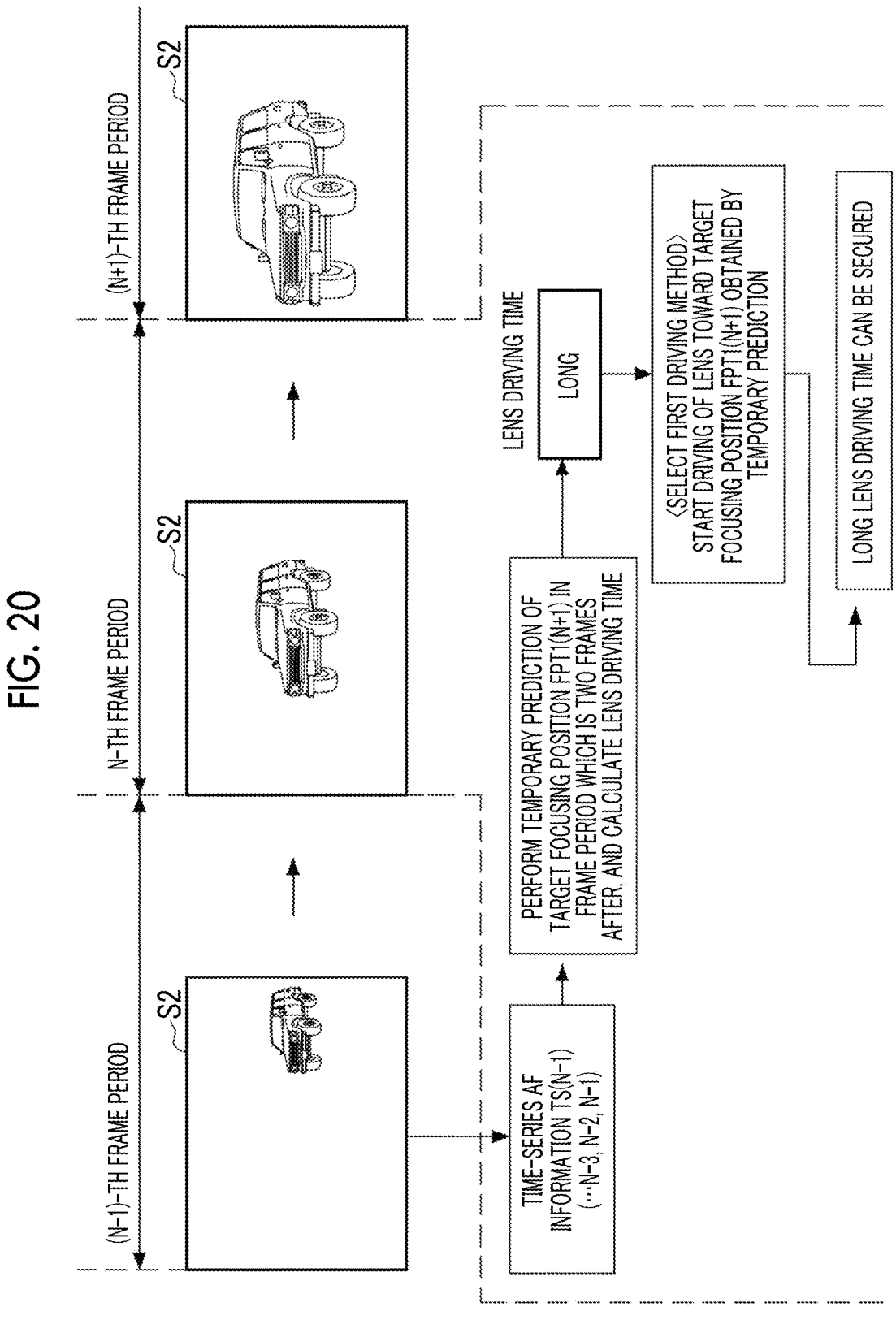
FIG. 20 is a diagram illustrating an effect of the first driving method.

In a case where the subject S2 illustrated in FIG. 20 moves at a high speed, the amount of the change of the focusing position FP per unit time increases. Therefore, the lens driving time LDT required for the focusing control is long. In a case where the frame rate of the continuous imaging is constant, it is necessary to move the focus lens 31 by the next frame period. According to the first driving method, the driving of the focus lens 31 is started toward the target focusing position FPT1(N+1) that is predicted by the temporary prediction without performing the main prediction. Thus, it is possible to secure the relatively-long lens driving time LDT until the next frame period.

On the other hand, in a case where the lens driving time LDT is equal to or shorter than the threshold value TH (N in step S150), the AF controller 55 transitions to step S180, and selects the accuracy-priority second driving method. Subsequently, the AF controller 55 transitions to step S190, and as illustrated in FIG. 18, performs AF calculation while waiting for the main exposure and the reading of the main image. The AF controller 55 acquires the latest AF information in the current N-th frame period by the AF calculation. In addition, the AF controller 55 executes the main prediction based on the time-series AF information TS(N) in which the acquired latest AF information is included. The AF controller 55 transitions to step S200, and executes the main prediction of the target focusing position FPT2(N+1) based on the time-series AF information TS(N). In addition, the AF controller 55 transitions to step S210, and starts driving of the focus lens 31 toward the target focusing position FPT2(N+1).

Figure 21:
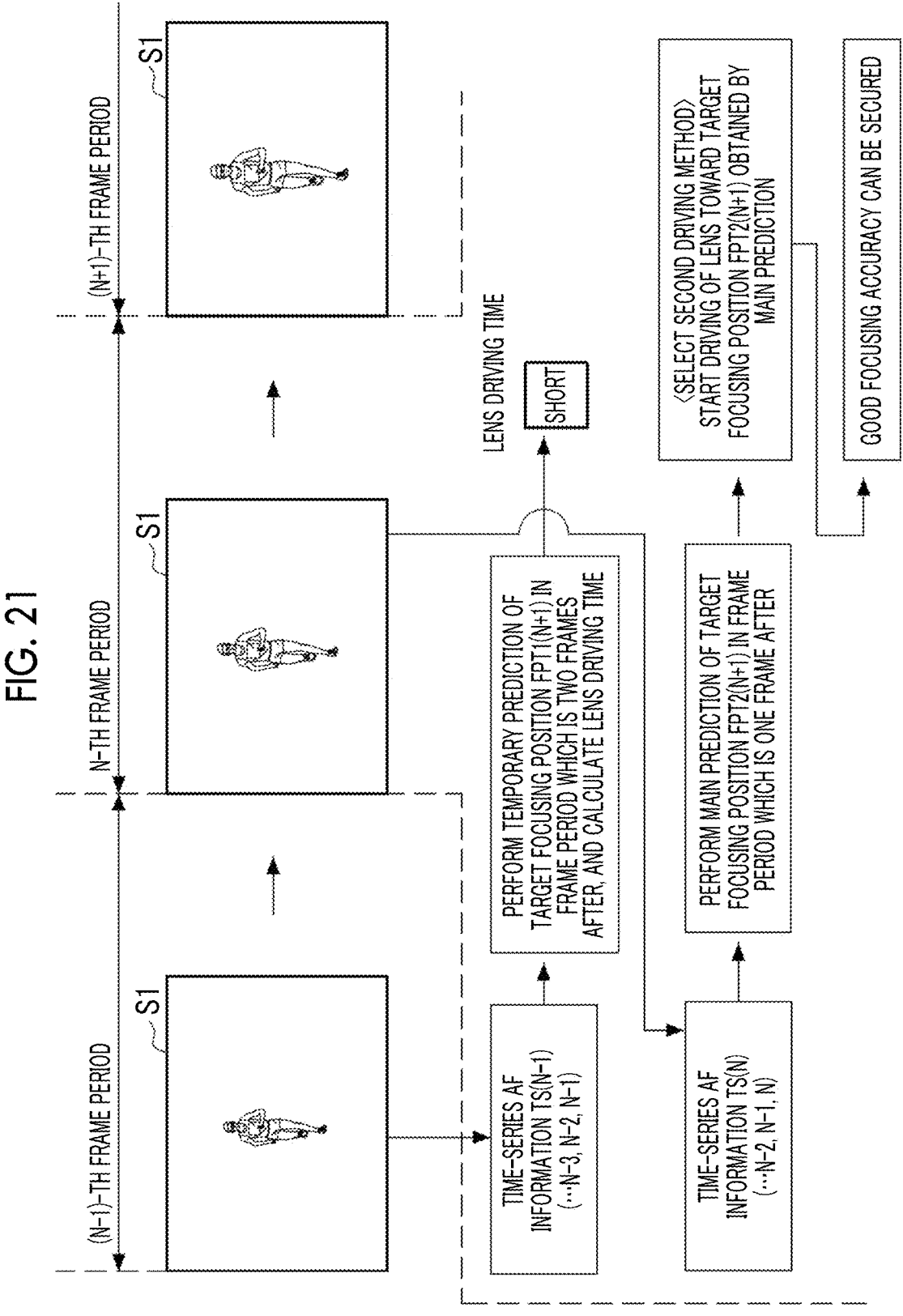
FIG. 21 is a diagram illustrating an effect of the second driving method.

In a case of a subject, such as the subject S1 illustrated in FIG. 21, having a slow movement, the amount of the change of the focusing position FP per unit time is small. Therefore, the lens driving time LDT required for the focusing control is short. With the second driving method, the main prediction of predicting the target focusing position FPT2(N+1) in a frame period which is one frame after is performed based on the time-series AF information TS(N) in which the AF information in the current N-th frame period is included. Thus, as compared with the first driving method, it is possible to secure good focusing accuracy. In addition, since the lens driving time LDT is relatively short, it is possible to complete the movement of the focus lens 31 to the target focusing position FPT2(N+1) by the next frame period. The AF controller 55 repeats the processing until the continuous imaging is completed (step S220).

As described above, with the focusing control device including the AF controller 55 according to the technology of the present disclosure and the imaging apparatus 10 comprising the focusing control device, in the N-th frame period, the lens driving time LDT for moving the focus lens 31 to the first target focusing position in the (N+1)-th frame period (as an example, the target focusing position FPT1 (N+1)) is predicted based on the first time-series AF information (as an example, the time-series AF information TS(N−1)) in which the AF information (as an example, the focusing position (N)) obtained in the (N−1)-th frame period is included. In addition, the driving method of the focus lens 31 that is to be executed in the N-th frame period is selected based on the predicted lens driving time LDT. Therefore, it is possible to perform appropriate focusing according to a change in the movement of the subject. Further, even in a case where the imaging apparatus 10 moves with respect to the subject instead of or in addition to the movement of the subject, it is possible to perform appropriate focusing according to a change in the movement of the imaging apparatus 10 in the same manner.

In addition, in a case where the lens driving time LDT is longer than the threshold value TH, the processor 40 functioning as the AF controller 55 selects, as the driving method, the first driving method of starting the driving of the focus lens 31 toward the target focusing position FPT1(N+1) at a timing at which the focusing control in the (N+1)-th frame period is in time. Therefore, even in a case of the continuous imaging in which it is difficult to secure the lens driving time LDT depending on the frame rate, follow-up of the focusing on the subject that moves at a high speed is improved.

In a case where the lens driving time LDT is longer than the threshold value TH, the processor 40 functioning as the AF controller 55 selects, as the driving method, the first driving method of starting the driving of the focus lens toward the target focusing position FPT1(N+1) before acquiring the focusing position (N) in the N-th frame period. Therefore, follow-up of the focusing on the subject that moves at a high speed, such as the subject S2 illustrated in FIG. 20, is improved.

In addition, in a case where the lens driving time LDT for moving the lens to the target focusing position FPT1(N+1) is equal to or shorter than the threshold value TH, the processor 40 functioning as the AF controller 55 predicts the second target focusing position (as an example, the target focusing position FPT2(N+1)) in the (N+1)-th frame period based on the second time-series AF information (as an example, the time-series AF information TS(N)) in which the focusing position FP(N) in the N-th frame period is included, and selects, as the driving method, the second driving method of starting the driving of the focus lens 31 toward the predicted target focusing position FPT2(N+1). Therefore, in a case where the movement of the subject is slow as in the subject S1 illustrated in FIG. 21, it is possible to secure good focusing accuracy.

In addition, in the embodiment, the AF information indicating the focusing position FP as an example is information acquired by using the phase difference detection pixels P1 and P2 disposed in the imaging region 20B of the imaging sensor 20. By providing the phase difference detection pixels P1 and P2 in a dispersed manner in the imaging region 20B, the range of the AF area RA that can be set is expanded in the imaging region 20B. Therefore, follow-up of the focusing on the moving subject is improved. In addition, the phase difference detection method has an advantage of a faster focusing speed as compared with the contrast method. Here, in the technology of the present disclosure, as the focusing method, the contrast method may be used instead of the phase difference detection method.

In addition, in the embodiment, the AF information that is used for the first time-series AF information, which is a basis for the temporary prediction, is acquired based on the main image captured once for each frame period. Since the resolution of the main image is higher than, for example, the resolution of the live view image or the like, there is a case where the prediction accuracy of the lens driving time LDT is improved.

In addition, in the embodiment, the focusing control is performed during the continuous imaging in which main images are continuously captured over a plurality of frame periods while the release button is being pushed. During the continuous imaging, the frame period is limited by the frame rate, and as a result, it is difficult to secure the lens driving time LDT. In such a case, the technology of the present disclosure is particularly effective.

Hereinafter, various modification examples of the above-described embodiment will be described.

First Modification Example

In the embodiment, an example in which, in a case of performing the main prediction of predicting the target focusing position FPT2(N+1), the AF calculation is performed after reading of all the pixels of the main image is completed to perform the main prediction has been described. On the other hand, as in the first modification example illustrated in FIG. 22 to FIG. 24, the AF calculation may be started before the reading of all the pixels.

Figure 22:
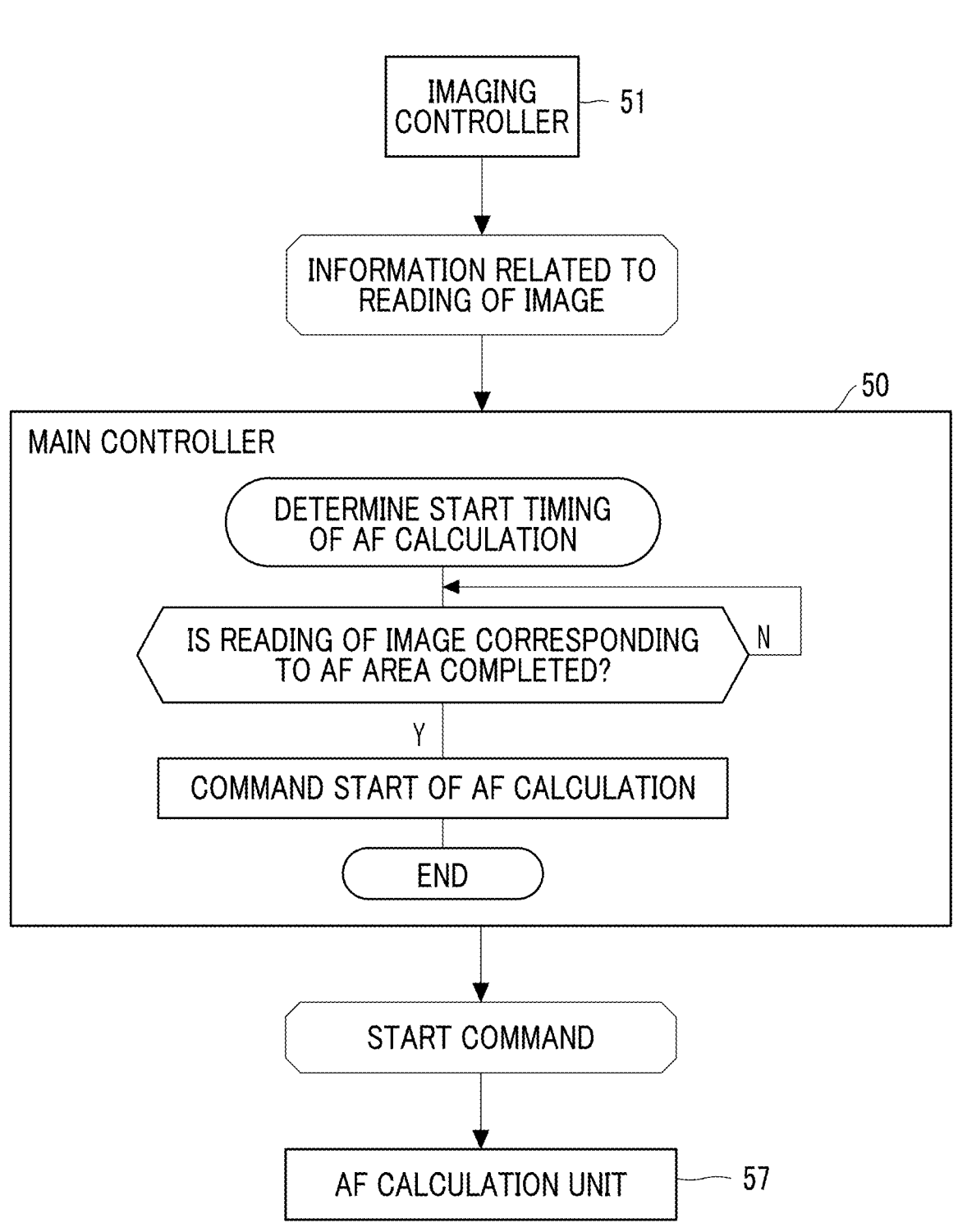
FIG. 22 is a conceptual diagram of a first modification example.

As illustrated in FIG. 22, in a case where the AF area RA for acquiring the AF information is set in the imaging region 20B, the processor 40 may acquire information that includes the imaging region 20B and is related to the reading of the image by the imaging sensor 20, determine a state of the reading of the image corresponding to the AF area RA based on the acquired information, and start the prediction of the target focusing position FPT2(N+1) that is an example of the second target focusing position in a case where it is determined that the reading of the image corresponding to the AF area RA is completed.

Figure 23:
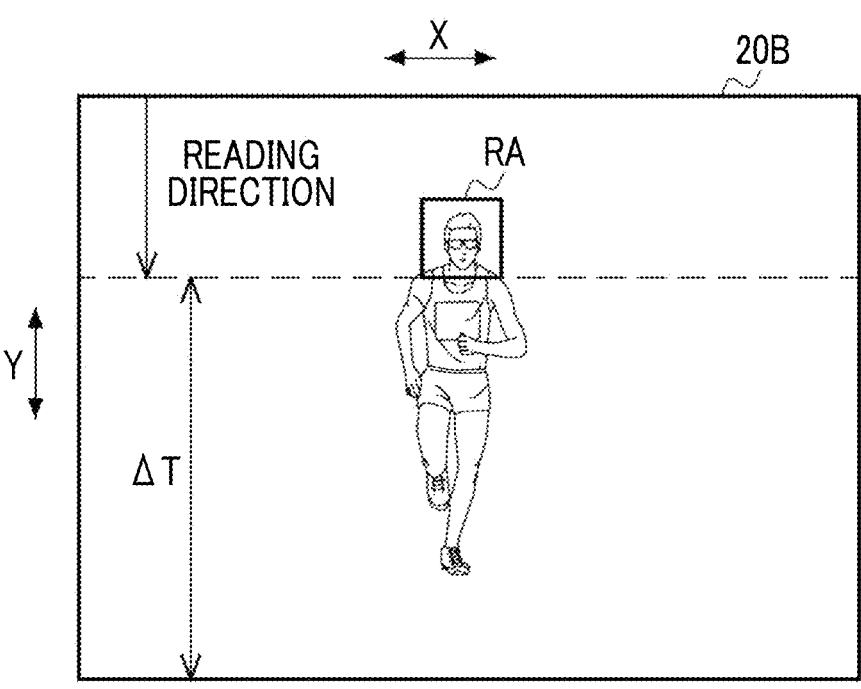
FIG. 23 is a diagram illustrating an outline of processing of the first modification example.

In this case, as illustrated in FIG. 23, the main controller 50 acquires information related to the reading of the image from the imaging controller 51. The reading of the image in the imaging region 20B is line reading, and the information related to the reading of the image is, for example, information indicating how many lines the imaging sensor 20 has completed reading. The main controller 50 acquires information related to the reading of the image from the imaging controller 51, and determines a start timing of the AF calculation. The main controller 50 determines a state of the reading of the image corresponding to the AF area RA based on the acquired information. In a case where it is determined that the reading of the image corresponding to the AF area RA is completed, the main controller 50 does not wait for completion of the reading of all the pixels, and commands the AF calculation unit 57 to start the AF calculation. The time-series AF information TS is updated by the AF information calculated by the AF calculation unit 57. The focusing position prediction unit 62 starts the main prediction of predicting the target focusing position FPT2(N+1) based on the updated time-series AF information TS(N).

Figure 24:
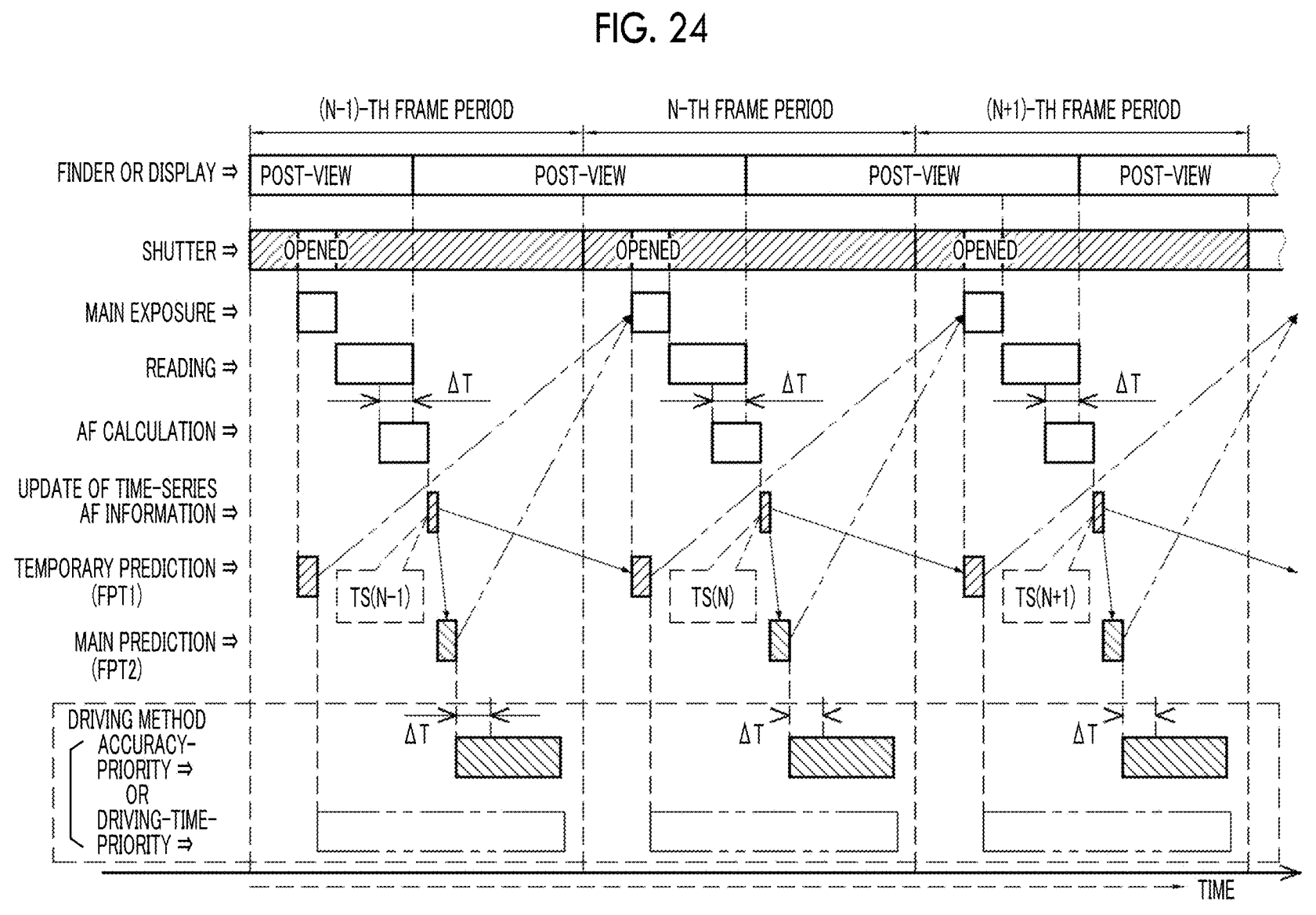

With the configuration, as illustrated in FIG. 24, the AF calculation can be started by ΔT earlier than in the example in FIG. 16 in which the AF calculation is started after the reading of all the pixels is completed. Therefore, the start timing of the main prediction to be performed after the AF calculation can also be made earlier by ΔT at maximum. As a result, it is also possible to secure the lens driving time LDT to be longer by ΔT at maximum. ΔT is a reading time of the remaining images after the AF area RA illustrated in FIG. 22.

Second Modification Example

Figure 25:
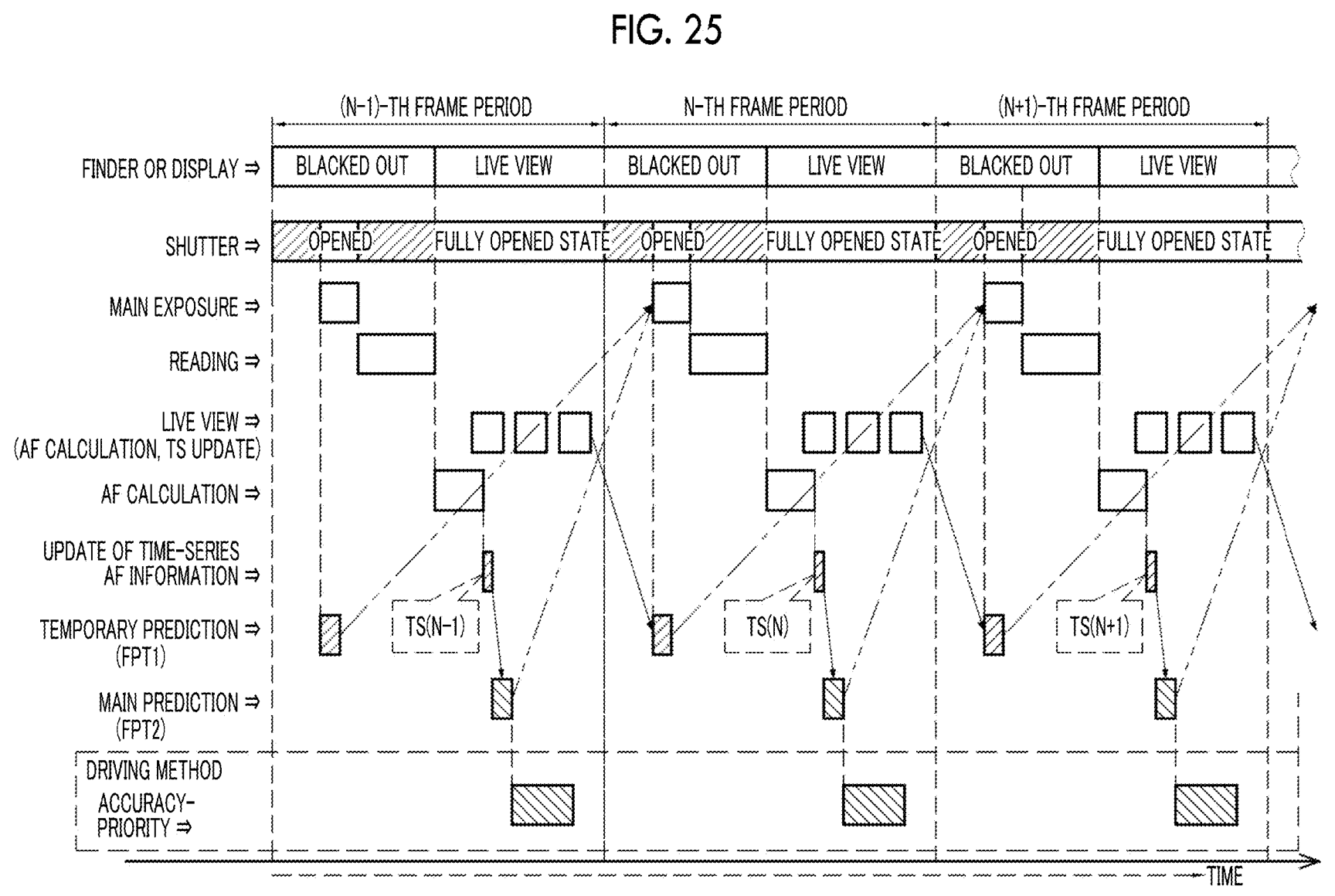

In addition, in the embodiment, the AF information used for the first time-series AF information (as an example, the time-series AF information (N−1)), which is a basis for the temporary prediction, is acquired based on the main image captured once for each frame period. On the other hand, as illustrated in FIG. 25, in a case where the live view continuous imaging is performed, the AF information may be acquired from the live view image instead of the main image.

First, in the live view continuous imaging, after the reading of the main image is completed, the shutter is in a fully opened state. In this state, a live view image is captured by using an electronic shutter function of the imaging sensor 20. The captured live view image is displayed on the finder 14 or the display 15. In the example illustrated in FIG. 25, an example in which the live view image is captured three times in each frame period has been described. Since the live view image cannot be captured while the shutter is being operated to capture the main image, the finder 14 or the display 15 is blacked out, and the live view image is not displayed.

In each frame period, the live view image is captured later than the main image. Therefore, since the live view image is captured later than the main image, the latest position of the subject is reflected as compared with the main image. Since the temporary prediction is performed based on the time-series AF information in which the latest AF information is included, there may be a case where the prediction accuracy of the focusing position FP is improved.

Preferably, the AF information is acquired from, for example, the latest live view image among a plurality of live view images captured in each frame period. This is because the latest position of the subject is reflected on the latest live view image among the plurality of live view images.

Figure 26:
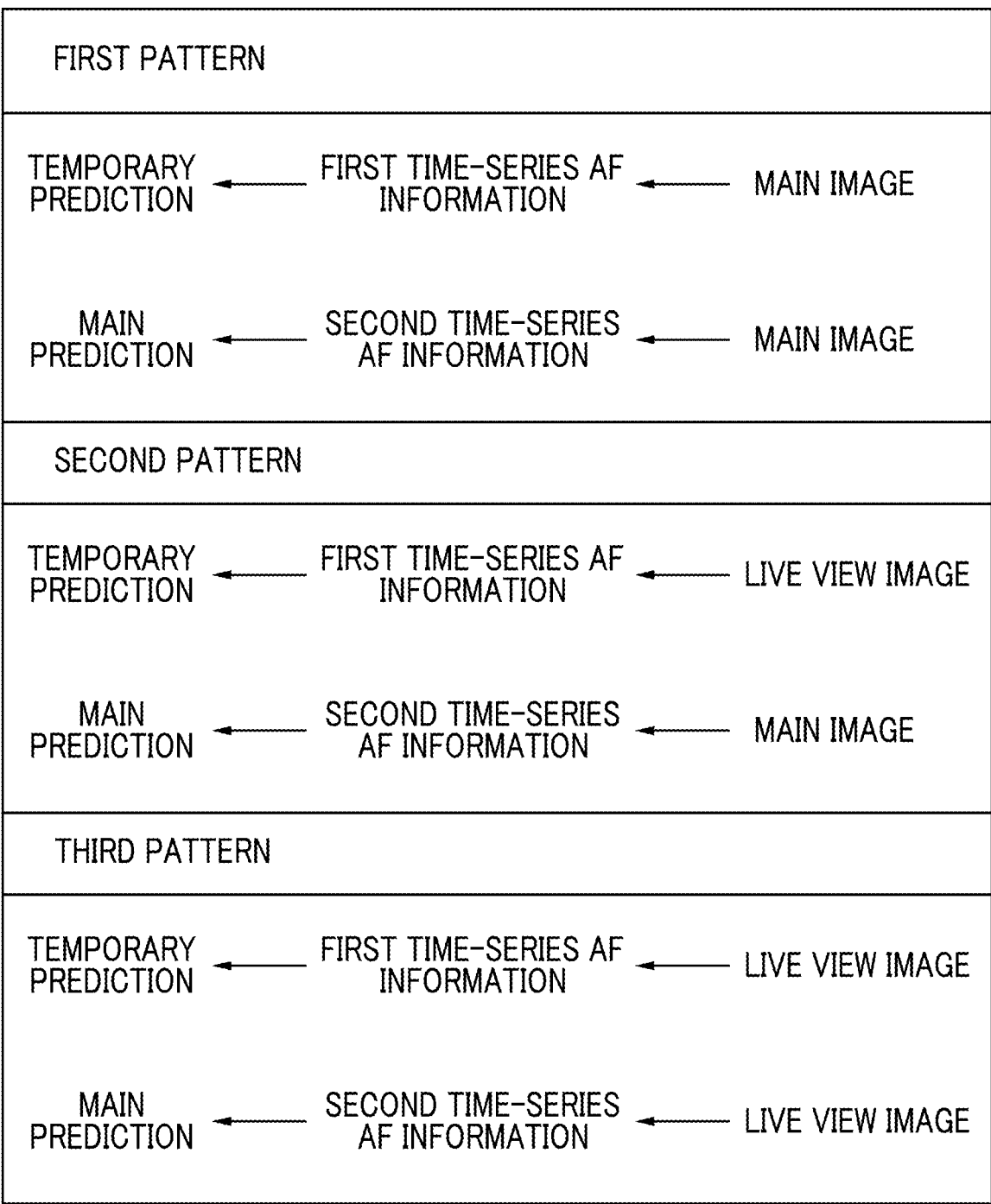
FIG. 26 is a diagram illustrating a pattern of acquisition sources of time-series AF information used for the temporary prediction and the main prediction.

Note that the acquisition sources of the first time-series AF information used for the temporary prediction and the second time-series AF information used for the main prediction are summarized as illustrated in FIG. 26. In FIG. 26, as illustrated in FIG. 16 to FIG. 18, first patterns are patterns in which the main image is the acquisition source. In the example illustrated in FIG. 25, the second pattern is a pattern in which the acquisition source of the first time-series AF information used for the temporary prediction is the live view image, and is a pattern in which the acquisition source of the second time-series AF information used for the main prediction is the main image. In addition to these cases, in a case of the live view continuous imaging, as illustrated in FIG. 26 as a third pattern, the acquisition sources of the first time-series AF information and the second time-series AF information may be the live view image.

In addition, as described in the embodiment, the technology of the present disclosure can be applied even in a case where imaging other than the continuous imaging is performed. For example, the technology of the present disclosure may be applied in a case of checking the composition while displaying the live view image by half-pushing the release button or in a case of simply displaying the live view image without operating the release button.

Thereby, it is possible to not only improve follow-up of the focusing on the live view image for the subject that moves at a high speed, but also improve the accuracy of the focusing on the live view image for the subject that moves at a low speed. Even in a case where the main image is not captured in this way, the technology of the present disclosure can be applied. The frame period in a case where the main image is not captured is a period in which at least one piece of AF information is acquired and the time-series AF information is updated by the acquired AF information.

Third Modification Example

Figure 27:
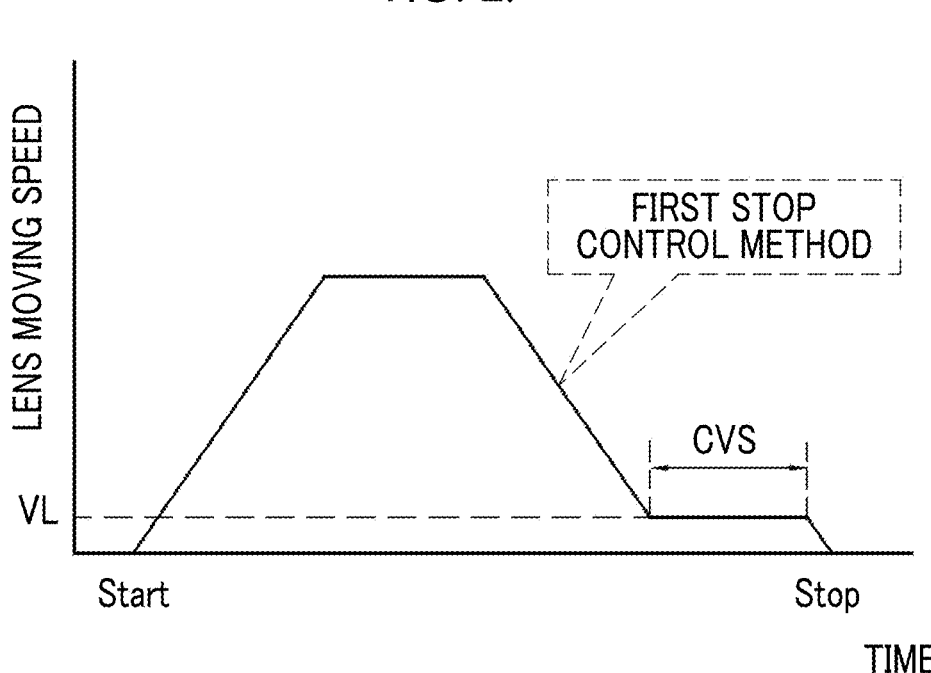
FIG. 27 is a graph illustrating a first stop control method.
Figure 28:
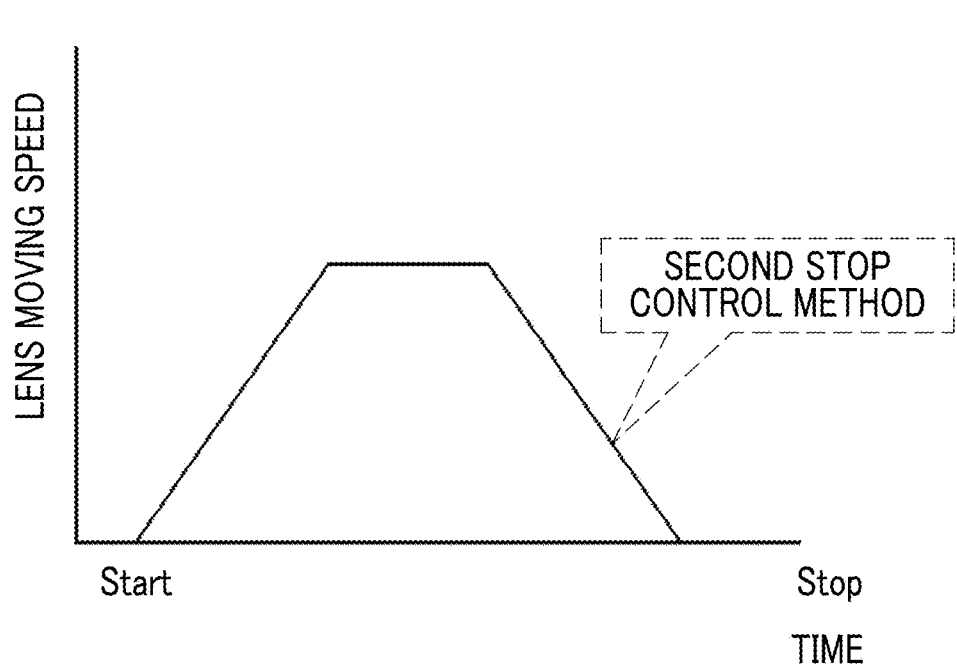
FIG. 28 is a graph illustrating a second stop control method.

A third modification example illustrated in FIG. 27 to FIG. 29 relates to content related to a stop control method of the focus lens 31. FIG. 27 and FIG. 28 are graphs in which the horizontal axis is time and the vertical axis is the lens moving speed, and show a temporal change in the moving speed from a movement start timing (Start) at which the movement of the focus lens 31 is started to a stop timing (Stop) at which the movement of the focus lens 31 is stopped.

As illustrated in FIG. 27, as stop control methods for stopping the focus lens 31 in a movement state, two stop control methods of a first stop control method and a second stop control method are provided for the imaging apparatus 10, the first stop control method being a method of decelerating the focus lens 31 to a preset speed VL and then stopping the focus lens 31 by using a constant speed section CVS in which the focus lens 31 is moved at a constant speed as illustrated in FIG. 27, the second stop control method being a method of continuously decelerating the focus lens 31 and then stopping the focus lens 31 without a constant speed section as illustrated in FIG. 28. The second stop control method illustrated in FIG. 28 is also called trapezoidal driving or the like because the graph has a trapezoidal shape. The main controller 50 selects any of the two stop control methods according to a preset condition, and stops the focus lens 31 by the selected stop control method.

Here, stopping the focus lens 31 means that the focus lens 31 reaches the target focusing position FPT in accordance with a timing of the exposure, and is a concept including, in addition to a case where the focus lens 31 is completely stopped at the target focusing position FPT, a case where the focus lens 31 is moved within a preset allowable error range with the target focusing position FPT as a reference. In addition, a time required for stopping the focus lens 31 corresponds to an exposure period according to the shutter speed. In addition, the concept of the constant speed section also includes a case where the lens moving speed changes within a preset allowable error range, in addition to a case where the lens moving speed is a completely constant speed.

The first stop control method illustrated in FIG. 27 is used in a case where it is desired to improve the accuracy of the stop position of the focus lens 31. For example, in a case where a fast lens having a small F number is used as the focus lens 31, since a subject depth is shallow, a focusing range of the focus lens 31 is narrow. As a result, an allowable error range of the stop position is decreased. In such a case, high accuracy is required as the accuracy of the stop position. In addition, since the fast focus lens 31 has a relatively large diameter, the weight of the focus lens 31 also tends to be relatively heavy. As a result, since the inertial force during the movement increases, the fast focus lens 31 often overruns the target stop position. In the first stop control method illustrated in FIG. 27, by interposing a constant speed section with a relatively low speed VL before stopping, overrunning of the stop position is prevented. Therefore, as compared with the second stop control method illustrated in FIG. 28, the accuracy of the stop position is improved.

FIG. 29 illustrates conditions under which the first stop control method with high accuracy of the stop position is selected. First, it is assumed that the imaging apparatus 10 has, as continuous imaging modes, two continuous imaging modes of a continuous-imaging-interval priority mode in which a continuous imaging interval is kept constant and a focus priority mode in which accuracy of focusing is prioritized over the continuous imaging interval. The processor 40 functioning as the main controller 50 selects the first stop control method in a case where the focus priority mode is selected as the continuous imaging mode and the F number of the optical system including the focus lens 31 is equal to or smaller than a setting value which is preset. In other cases, the second stop control method is selected. The setting value is set for, for example, a relatively fast lens with the F number of "1.0" or "1.4". As described above, with the imaging apparatus 10, the focus lens 31 is normally stopped in a short time by the second stop control method, and the first stop control method is selected in a case where high accuracy is required for the stop position. Thereby, it is possible to accurately stop the focus lens 31 at the target position.

Other Modification Examples

Note that, in the above-described embodiment, the display controller 53 causes the display 15 to display the image. On the other hand, instead of the display 15 or together with the display 15, the display controller 53 may cause the finder 14 to display the image. In this case, the focusing control device may be configured to allow the user to designate the AF area RA via a visual line input device.

The technology of the present disclosure is not limited to the digital camera and can also be applied to electronic devices such as a smartphone and a tablet terminal having an imaging function.

In the above-described embodiment, various processors to be described below can be used as the hardware structure of the controller using the processor 40 as an example. The above-described various processors include not only a CPU which is a general-purpose processor that functions by executing software (programs) but also a processor that has a changeable circuit configuration after manufacturing, such as an FPGA. The FPGA includes a dedicated electrical circuit that is a processor which has a dedicated circuit configuration designed to execute specific processing, such as PLD or ASIC, and the like.

The controller may be configured by one of these various processors or a combination of two or more of the processors of the same type or different types (for example, a combination of a plurality of FPGAs or a combination of a CPU and an FPGA). Alternatively, a plurality of controllers may be configured with one processor.

A plurality of examples in which a plurality of controllers are configured as one processor can be considered. As a first example, there is an aspect in which one or more CPUs and software are combined to configure one processor and the processor functions as a plurality of controllers, as represented by a computer such as a client and a server. As a second example, there is an aspect in which a processor that implements the functions of the entire system, which includes a plurality of controllers, with one IC chip is used, as represented by system on chip (SOC). In this way, the controller can be configured by using one or more of the above-described various processors as the hardware structure.

Furthermore, more specifically, it is possible to use an electrical circuit in which circuit elements such as semiconductor elements are combined, as the hardware structure of these various processors.

In addition, the program may be stored in a non-transitory computer readable storage medium.

The described contents and the illustrated contents are detailed explanations of a part according to the technique of the present disclosure, and are merely examples of the technique of the present disclosure. For example, the descriptions related to the configuration, the function, the operation, and the effect are descriptions related to examples of a configuration, a function, an operation, and an effect of a part according to the technique of the present disclosure. Therefore, it goes without saying that, in the described contents and illustrated contents, unnecessary parts may be deleted, new components may be added, or replacements may be made without departing from the spirit of the technique of the present disclosure. Further, in order to avoid complications and facilitate understanding of the part according to the technique of the present disclosure, in the described contents and illustrated contents, descriptions of technical knowledge and the like that do not require particular explanations to enable implementation of the technique of the present disclosure are omitted.

All documents, patent applications, and technical standards described in this specification are incorporated herein by reference to the same extent as in a case where each document, each patent application, and each technical standard are specifically and individually described by being incorporated by reference.

The following technique can be understood by the above description.

Appendix 1

A focusing control device that performs focusing control in each frame period of imaging, the focusing control device comprising:
a processor,
in which the processor is configured to:
predict, in an N-th frame period, a lens driving time for moving a focus lens to a first target focusing position in an (N+1)-th frame period based on first time-series AF information in which AF information obtained in an (N−1)-th frame period is included; and
select a driving method of the focus lens that is to be executed in the N-th frame period based on the predicted lens driving time.

Appendix 2

The focusing control device according to Appendix 1,
in which the processor is configured to, in a case where the lens driving time is longer than a threshold value, select, as the driving method, a first driving method of starting driving of the focus lens toward the first target focusing position at a timing at which the focusing control in the (N+1)-th frame period is in time.

Appendix 3

The focusing control device according to Appendix 1 or 2,
in which the processor is configured to, in a case where the lens driving time is longer than a threshold value, select, as the driving method, a first driving method of starting driving of the focus lens toward the first target focusing position before acquiring the AF information in the N-th frame period.

Appendix 4

The focusing control device according to any one of Appendixes 1 to 3,
in which the processor is configured to, in a case where the lens driving time to the first target focusing position is equal to or shorter than a threshold value, select, as the driving method, a second driving method of predicting a second target focusing position in the (N+1)-th frame period based on second time-series AF information in which the AF information in the N-th frame period is included, and starting driving of the focus lens toward the predicted second target focusing position.

Appendix 5

The focusing control device according to any one of Appendixes 1 to 4, in which the AF information is information acquired by using phase difference detection pixels disposed in an imaging region of an imaging element.

Appendix 6

The focusing control device according to Appendix 4 or 5, in which the processor is configured to, in a case where an AF area for acquiring the AF information is set in the imaging region:

acquire information related to reading of an image that includes the imaging region and is obtained by the imaging element;

determine a state of the reading of the image corresponding to the AF area based on the information; and start prediction of the second target focusing position in a case where it is determined that the reading of the image corresponding to the AF area is completed.

Appendix 7

The focusing control device according to any one of Appendixes 1 to 6, in which the AF information used in the first time-series AF information is acquired based on a main image captured once in each of the frame periods.

Appendix 8

The focusing control device according to any one of Appendixes 1 to 7, in which the AF information used in the first time-series AF information is acquired based on a live view image captured in each of the frame periods.

Appendix 9

The focusing control device according to Appendix 8, in which the live view image is a latest live view image among a plurality of live view images captured in each of the frame periods.

Appendix 10

The focusing control device according to any one of Appendixes 1 to 9, in which the focusing control is performed during continuous imaging in which a main image is continuously captured over a plurality of frame periods while a release button is being pushed.

Appendix 11

The focusing control device according to any one of Appendixes 1 to 10, in which, as a stop control method of stopping the focus lens during movement, two stop control methods of a first stop control method and a second stop control method are provided for the focusing control device, the first stop control method being a method of decelerating the focus lens to a preset speed and then stopping the focus lens by using a constant speed section in which the focus lens is moved at a constant speed, the second stop control method being a method of continuously decelerating the focus lens and stopping the focus lens without using the constant speed section.

Appendix 12

The focusing control device according to Appendix 11, in which, as continuous imaging modes, two continuous imaging modes of a continuous-imaging-interval priority mode in which a continuous imaging interval is kept constant and a focus priority mode in which accuracy of focusing is prioritized over the continuous imaging interval are provided, and the processor is configured to select the first stop control method in a case where the focus priority mode is selected as the continuous imaging mode and an F number of an optical system including the focus lens is equal to or smaller than a setting value which is preset.

Appendix 13

An imaging apparatus comprising:

the focusing control device according to any one of Appendixes 1 to 12; and an imaging element.

Appendix 14

A focusing control method of performing focusing control in each frame period of imaging, the focusing control method comprising:

predicting, in an N-th frame period, a lens driving time for moving a focus lens to a first target focusing position in an (N+1)-th frame period based on first time-series AF information in which AF information obtained in an (N−1)-th frame period is included; and selecting a driving method of the focus lens that is to be executed in the N-th frame period based on the predicted lens driving time.

Appendix 15

A focusing control program causing a processor to execute focusing control in each frame period of imaging, the focusing control program causing the processor to execute a process comprising:

predicting, in an N-th frame period, a lens driving time for moving a focus lens to a first target focusing position in an (N+1)-th frame period based on first time-series AF information in which AF information obtained in an (N−1)-th frame period is included; and selecting a driving method of the focus lens that is to be executed in the N-th frame period based on the predicted lens driving time.

What is claimed is:

1. A focusing control device that performs focusing control in each frame period of imaging, the focusing control device comprising:

a processor, wherein the processor is configured to:

predict, in an N-th frame period, a lens driving time for moving a focus lens to a first target focusing position in an (N+1)-th frame period based on first time-series auto focus (AF) information in which AF information obtained in an (N−1)-th frame period is included; and select a driving method of the focus lens that is to be executed in the N-th frame period based on the predicted lens driving time, wherein the processor is configured to, in a case where the lens driving time is longer than a threshold value, select, as the driving method, a first driving method of starting driving of the focus lens toward the first target focusing position before acquiring the AF information in the N-th frame period.

2. The focusing control device according to claim 1, wherein the processor is configured to, in a case where the lens driving time is longer than a threshold value, select, as the driving method, a first driving method of starting driving of the focus lens toward the first target focusing position at a timing at which the focusing control in the (N+1)-th frame period is in time.

3. The focusing control device according to claim 2, wherein the processor is configured to, in a case where the lens driving time to the first target focusing position is equal to or shorter than the threshold value, select, as the driving method, a second driving method of predicting a second target focusing position in the (N+1)-th frame period based on second time-series AF information in which the AF information in the N-th frame period is included, and starting driving of the focus lens toward the predicted second target focusing position.

4. The focusing control device according to claim 1, wherein the processor is configured to, in a case where the lens driving time to the first target focusing position is equal to or shorter than a threshold value, select, as the driving method, a second driving method of predicting a second target focusing position in the (N+1)-th frame period based on second time-series AF information in which the AF information in the N-th frame period is included, and starting driving of the focus lens toward the predicted second target focusing position.

5. The focusing control device according to claim 4, wherein the processor is configured to, in a case where an AF area for acquiring the AF information is set in the imaging region:

acquire information related to reading of an image that includes the imaging region and is obtained by the imaging element;

determine a state of the reading of the image corresponding to the AF area based on the information; and start prediction of the second target focusing position in a case where it is determined that the reading of the image corresponding to the AF area is completed.

6. The focusing control device according to claim 1, wherein the AF information is information acquired by using phase difference detection pixels disposed in an imaging region of an imaging element.

7. The focusing control device according to claim 1, wherein the AF information used in the first time-series AF information is acquired based on a main image captured once in each of the frame periods.

8. The focusing control device according to claim 1, wherein the AF information used in the first time-series AF information is acquired based on a live view image captured in each of the frame periods.

9. The focusing control device according to claim 8, wherein the live view image is a latest live view image among a plurality of live view images captured in each of the frame periods.

10. The focusing control device according to claim 1, wherein the focusing control is performed during continuous imaging in which a main image is continuously captured over a plurality of frame periods while a release button is being pushed.

11. The focusing control device according to claim 1, wherein, as a stop control method of stopping the focus lens during movement, two stop control methods of a first stop control method and a second stop control method are provided for the focusing control device, the first stop control method being a method of decelerating the focus lens to a preset speed and then stopping the focus lens by using a constant speed section in which the focus lens is moved at a constant speed, the second stop control method being a method of continuously decelerating the focus lens and stopping the focus lens without using the constant speed section.

12. The focusing control device according to claim 11, wherein, as continuous imaging modes, two continuous imaging modes of a continuous-imaging-interval priority mode in which a continuous imaging interval is kept constant and a focus priority mode in which accuracy of focusing is prioritized over the continuous imaging interval are provided, and the processor is configured to select the first stop control method in a case where the focus priority mode is selected as the continuous imaging mode and an F number of an optical system including the focus lens is equal to or smaller than a setting value which is preset.

13. An imaging apparatus comprising:

the focusing control device according to claim 1 an imaging element.

14. A focusing control method of performing focusing control in each frame period of imaging, the focusing control method comprising:

predicting, in an N-th frame period, a lens driving time for moving a focus lens to a first target focusing position in an (N+1)-th frame period based on first time-series auto focus (AF) information in which AF information obtained in an (N−1)-th frame period is included;

selecting a driving method of the focus lens that is to be executed in the N-th frame period based on the predicted lens driving time; and in a case where the lens driving time is longer than a threshold value, selecting, as the driving method, a first driving method of starting driving of the focus lens toward the first target focusing position before acquiring the AF information in the N-th frame period.

15. A non-transitory computer-readable storage medium storing a focusing control program causing a processor to execute focusing control in each frame period of imaging, the focusing control program causing the processor to execute a process comprising:

predicting, in an N-th frame period, a lens driving time for moving a focus lens to a first target focusing position in an (N+1)-th frame period based on first time-series auto focus (AF) information in which AF information obtained in an (N−1)-th frame period is included;

selecting a driving method of the focus lens that is to be executed in the N-th frame period based on the predicted lens driving time; and in a case where the lens driving time is longer than a threshold value, selecting, as the driving method, a first driving method of starting driving of the focus lens toward the first target focusing position before acquiring the AF information in the N-th frame period.

* * * * *